US011212649B2

(12) United States Patent
Ivanov et al.

(10) Patent No.: US 11,212,649 B2
(45) Date of Patent: Dec. 28, 2021

(54) DETERMINING A NON-GNSS BASED POSITION OF A MOBILE DEVICE

(71) Applicant: HERE GLOBAL B.V., Eindhoven (NL)

(72) Inventors: Pavel Ivanov, Tampere (FI); Lauri Aarne Johannes Wirola, Tampere (FI); Henri Jaakko Julius Nurminen, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 24 days.

(21) Appl. No.: 16/687,078

(22) Filed: Nov. 18, 2019

(65) Prior Publication Data

US 2020/0169846 A1 May 28, 2020

(30) Foreign Application Priority Data

Nov. 23, 2018 (EP) .................................... 18207955

(51) Int. Cl.

*H04W 4/029* (2018.01)
*H04W 4/80* (2018.01)

(Continued)

(52) U.S. Cl.

CPC .......... *H04W 4/029* (2018.02); *G01C 21/206* (2013.01); *G08G 1/123* (2013.01); *H04W 4/80* (2018.02)

(58) Field of Classification Search

CPC ....... H04W 4/022; H04W 4/38; H04W 4/029; H04W 52/0261; H04W 52/0254; H04W 4/33

(Continued)

(56) References Cited

U.S. PATENT DOCUMENTS 5,704,189 A * 1/1998 Collier ..................... H02G 1/00 283/67
8,489,127 B2 7/2013 Huang et al.

(Continued)

FOREIGN PATENT DOCUMENTS

EP 3 076 128 A1 10/2016
EP 3657196 A1 * 11/2018

OTHER PUBLICATIONS

Smartphone Sensing Meets Transport Data: A Collaborative Framework for Transportation Service Analytics by Yu Lu; Archan Misra; wen Sun; Huayu Wu Published in: IEEE Transactions on Mobile Computing (vol. 17, Issue: 4, Apr. 1, 2018) (Year: 2018).*

(Continued)

*Primary Examiner* — William D Cumming
(74) *Attorney, Agent, or Firm* — Alston & Bird LLP

(57) ABSTRACT

A method, apparatus and computer readable storage medium determine the position of a mobile device. Position data items are collected that indicate if the mobile device was located in a vicinity of a predetermined public transportation building when the respective position parameter was captured. Motion data items are also collected that represent a respective motion parameter captured by the mobile device within the vicinity of the predetermined public transportation building. Based on the positioning data item(s), the motion data item(s) and/or public transportation data, it is determined if the mobile device has left the vicinity of the predetermined public transportation building on board a public transportation vehicle and/or has arrived at the vicinity of the predetermined public transportation building on board a public transportation vehicle and, if so, the motion data item(s) are associated with a boarding or waiting and/or arrival area for passengers of the public transportation vehicle.

19 Claims, 4 Drawing Sheets

1
105 Radio Interface
100 Processor
104 Motion Sensor(s)
101 Program Memory
102 Main Memory
103 Radio Interface 200
201 collecting a plurality of position data items, wherein each of the plurality of position data items represents a respective position parameter captured y the mobile device, and wherein each of the plurality of position data items is at least indicative of whether or not the mobile devices was located in a vicinity of a predetermined public transportation building when the respective position parameter was captured by the mobile device,
202 collecting a plurality of motion data items, wherein each of the plurality of motion data items represent a respective motion parameter captured by the mobile device within the vicinity of the predetermined public transportation building.
203 collecting a plurality of radio fingerprint observation reports captured by the mobile device within the vicinity of the predetermined public transportation building,
204 determining, at least partially based on at least one of the plurality of positioning data items, the plurality of motion data items and public transportation data, whether or not the mobile device has left the vicinity of the predetermined public transportation building on board of a public transportation and/or has arrived at the vicinity of the predetermined public transportation building on board of a public transportation vehicle
205 mobile device has left and/or arrived at the vicinity of the predetermined public transportation building on board of a public transportation vehicle?
NO
YES
A

(51) Int. Cl.
*G01C 21/20* (2006.01)
*G08G 1/123* (2006.01)

(58) Field of Classification Search
USPC .......................................................... 348/143
See application file for complete search history.

(56) References Cited

U.S. PATENT DOCUMENTS

| | | | | |
|---|---|---|---|---|
| 8,531,523 | B2* | 9/2013 | Anderson | H04W 4/029 348/143 |
| 8,626,198 | B2 | 1/2014 | Das et al. | |
| 9,179,253 | B2* | 11/2015 | Cho | G06F 16/29 |
| 9,237,465 | B1* | 1/2016 | Tanner | G06Q 20/3278 |
| 9,305,292 | B1* | 4/2016 | Skelding | G06Q 20/1085 |
| 9,560,489 | B2 | 1/2017 | Marti et al. | |
| 9,674,669 | B2* | 6/2017 | Subramanian | H04W 4/029 |
| 9,713,428 | B2* | 7/2017 | Chon | A61B 5/02416 |
| 10,445,997 | B2* | 10/2019 | Molloy | G01C 21/34 |
| 10,627,230 | B1* | 4/2020 | Karvounis | G01C 5/00 |
| 10,726,688 | B2* | 7/2020 | Molloy | H04W 4/33 |
| 10,827,324 | B1* | 11/2020 | Hajimiri | G06K 7/10366 |
| 2013/0116966 | A1* | 5/2013 | D'Jesus Bencci | G01S 5/0242 702/150 |
| 2016/0094954 | A1 | 3/2016 | Millman et al. | |
| 2016/0309304 | A1* | 10/2016 | Subramanian | G01C 21/206 |
| 2016/0379141 | A1 | 12/2016 | Judge et al. | |
| 2017/0023368 | A1* | 1/2017 | Guse | G01C 21/206 |
| 2018/0365942 | A1* | 12/2018 | Molloy | A62B 5/00 |
| 2019/0295397 | A1* | 9/2019 | Eckert | G08B 15/00 |
| 2019/0371138 | A1* | 12/2019 | Molloy | G01C 21/34 |
| 2020/0141727 | A1* | 5/2020 | Karvounis | G01C 5/00 |
| 2020/0169846 | A1* | 5/2020 | Ivanov | G08G 1/123 |

OTHER PUBLICATIONS

Intelligent Transportation and Control Systems Using Data Mining and Machine Learning Techniques: A Comprehensive Study by Nawaf O. Alsrehin; Ahmad F. Klaib; Aws Magableh Published in: IEEE Access (vol. 7) Apr. 2019 (Year: 2019).*

Extended European Search Report for Application No. EP 18207955.8 dated Jun. 26, 2019, 10 pages.

Vanderhulst, G, et al., *CrumbIR: Enabling Proxemic Services Through Opportunistic Location Sharing*, 2015 IEEE International Conference on Pervasive Computing and Communication Work in Progress (2015) 259-262.

Zhou, B. et al., *A Robust Crowdsourcing-Based Indoor Localization System*, Sensor 17, 864 (2017) 16 pages.

* cited by examiner

DETERMINING A NON-GNSS BASED POSITION OF A MOBILE DEVICE

CROSS-REFERENCE TO RELATED APPLICATIONS

This application claims priority to EP Application No. 18207955.8, filed Nov. 23, 2018, the entire contents of which are incorporated herein by reference.

FIELD OF THE DISCLOSURE

The invention relates to the field of determining a non-GNSS (e.g. indoor) position of a mobile device and more specifically to determining a non-GNSS based (e.g. indoor) position of a mobile device for determining or updating a radio map for an indoor radio positioning system.

BACKGROUND

Satellite signal based positioning technologies, which are mainly used outdoors, are usually not suited to deliver a satisfactory performance when used for indoor positioning, since satellite radio signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, BLUETOOTH® low energy (BLE) based positioning systems, cellular network based positioning systems and wireless local area network (WLAN) based positioning systems.

Such a non-GNSS based radio positioning system (e.g. a self-contained positioning system) may be divided in at least three stages, an installation stage, a training stage and a positioning stage.

In the installation stage, dedicated positioning support radio devices (e.g. BLUETOOTH® beacons) may be installed in the environment for which a positioning system is to be provided. Alternatively or additionally, a non-GNSS based radio positioning system may make use of existing radio devices like WLAN access points or cellular network nodes as positioning support radio devices.

In the subsequent training stage, training data are collected. The training data may be collected in the form of radio fingerprint observation reports that are based on measurements by mobile devices. A radio fingerprint observation report may indicate an observation position and radio signal parameters obtained as a result of measurements taken from the radio interface when scanning for observable radio signals at the observation position.

The observation position may be for example GNSS based. However, when collecting radio fingerprint observation reports inside a building in the training stage, it is often not possible to determine a GNSS based indoor observation position.

Measurements taken from the radio interface may comprise, by way of example, measured received signal strengths and identifiers of radio devices (e.g. BLUETOOTH® beacons. WLAN access points, base stations of a cellular network) transmitting the radio signals observable at the observation position. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crow-sourcing is a background process that does not directly benefit the device user, it is desirable that the crowd-sourcing process only consumes limited resources of the device Alternatively or additionally, mobile devices may be used for collecting radio fingerprint observation reports in a systematic manner. Collected fingerprint data may be uploaded to a database in a positioning server or in a positioning cloud, where algorithms may be run to generate radio coverage models of positioning support devices (e.g. BLUETOOTH® beacons, WLAN access points, base stations of a cellular network) and/or radio maps for positioning purposes.

In the positioning stage, a mobile device may estimate its current position based on own measurements taken from the radio interface and on the data or a subset of data that is available from the training stage. Radio coverage model information or radio map information that has been generated in the training stage may be provided to mobile devices by a positioning server via the Internet as assistance information for use in position estimation. Alternatively, radio coverage model information and/or radio map information may be stored in a positioning server to which the mobile devices may connect to via the Internet for obtaining a position estimate.

SUMMARY OF SOME EMBODIMENTS OF THE INVENTION

According to an exemplary aspect of the invention, a method is disclosed, wherein the method comprises:

collecting a plurality of position data items, wherein each of the plurality of position data items represents a respective position parameter captured by the mobile device, and wherein each of the plurality of position data items is at least indicative of whether or not the mobile device was located in a vicinity of a predetermined public transportation building when the respective position parameter was captured by the mobile device;

collecting a plurality of motion data items associated with the mobile device, wherein each of the plurality of motion data items represents a respective motion parameter captured by the mobile device within the vicinity of the predetermined public transportation building;

determining, at least partially based on at least one of (1) the plurality of positioning data items, (2) the plurality of motion data items and (3) public transportation data, whether or not the mobile device (1) has left the vicinity of the predetermined public transportation building on board of a public transportation vehicle and/or (2) has arrived at the vicinity of the predetermined public transportation building on board of a public transportation vehicle;

if it is determined that the mobile device (1) has left the vicinity of the predetermined public transportation building on board of a public transportation vehicle and/or (2) has arrived at the vicinity of the predetermined public transportation building on board of a public transportation vehicle, associating one or more of the plurality of motion data items with at least one boarding or waiting or arrival area for passengers of the public transportation vehicle.

The disclosed method may serve for determining a non-GNSS (e.g. indoor) position of a mobile device, for example for determining a non-GNSS based (e.g. indoor) position of a mobile device for determining or updating a radio map for an (e.g. indoor) radio positioning system.

The mobile device may be an Internet-of-Thing (IoT) device, a smart home device, a smartphone, a tablet computer, a notebook computer, a smart watch, and a smart band.

The disclosed method may be performed by at least one apparatus (e.g. any one embodiment of the apparatus(es) disclosed below). For example, the disclosed method may be performed by the mobile device or by a remote device (i.e. a device different from or remote to the mobile device) like a server (e.g. a positioning server). Alternatively, the mobile device and the remote device may cooperate to perform the disclosed method.

Public transportation may be understood to relate to transport of passengers by group travel systems available for use by the general public, typically managed on a schedule and operated on established routes like transportation of passenger by railways, airlines, buses or ferries. Accordingly, exemplary public transportation vehicles are a train, an airplane, a bus or a ferry; and exemplary predetermined public transportation buildings are an airport or airport building, a train station or train station building, a bus terminal or bus terminal building, or a ferry terminal or ferry terminal building, and exemplary boarding or waiting or arrival areas for passengers of the public transportation vehicle are a gate of an airport or airport building, a platform of a train station or train station building, a platform of a bus terminal or bus terminal building, or a gangway of a ferry terminal or ferry terminal building. Therein, a predetermined public transportation building may be understood to also refer to a predetermined complex of one or more public transportation building(s) like a complex of one or more airport buildings.

That the predetermined public transportation building is predetermined may for example be understood to mean that it is predetermined that the disclosed method should be applied with respect to this predetermined public transportation building. It is however to be understood that there may be a plurality of predetermined public transportation buildings for which it is predetermined that the disclosed method should be applied with respect to them. For example, the predetermined public transportation building may be understood to be a predetermined public transportation building for which a non-GNSS based indoor positioning system as disclosed above is provided which is in the training stage.

A parameter (e.g. a motion parameter, a position parameter or a radio signal parameter) may be captured by the mobile device by capturing (e.g. measuring) a value of a physical quantity by the mobile device (e.g. by a sensor of the mobile device) and, optionally, by determining the parameter at least partially based on the captured value of the physical quantity. Accordingly, the captured parameter (e.g. a motion parameter, a position parameter or a radio signal parameter) may correspond to the captured value of the physical quantity or may at least partially be based on the captured value of the physical quantity. As a result of capturing such a parameter (e.g. a motion parameter, a position parameter or a radio signal parameter) by the mobile device, a data item (e.g. a position data item, a motion data item or a radio fingerprint observation report) representing the captured parameter may be generated by the mobile device.

Collecting a plurality of data items (e.g. position data items, motion data items, radio fingerprint observation reports) may be understood to mean that the plurality of data items are stored (e.g. in memory means of the at least one apparatus performing the disclosed method). As disclosed above, the data items of the plurality of data items may be (e.g. subsequently) generated by the mobile device. Accordingly, if the plurality of data items is collected by the mobile device, the plurality of data items may be obtained (e.g. subsequently) as a result of (e.g. subsequently) generating the data items of the plurality of data items. However, if the plurality of data items is collected by a remote device like a server, the plurality of data items may be obtained by receiving the plurality of data items from the mobile device (e.g. the data items of the plurality of data items may be received at once or subsequently from the mobile device).

Examples of such pluralities of data items are the plurality of position data items, the plurality of motion data items and a plurality of radio fingerprint observation reports.

Each of the plurality of position data items represents a respective position parameter captured by the mobile device. It is to be understood that the mobile device may repeatedly (e.g. periodically) capture a position parameter such that the plurality of position data items represents a sequence of position parameters captured by the mobile device.

A position parameter (e.g. each position parameter represented by the plurality of position data items) may be indicative at least of the coarse position of the mobile device when the position parameter was captured. The coarse position of the mobile device may for example indicate a predetermined area covering the (e.g. absolute) position of the mobile device, but may not indicate the (e.g. absolute) position of the mobile device. For example, the predetermined area may be part of a plurality of predetermined areas for each of which it is predetermined whether or not it is part of the vicinity of the predetermined public transportation building. Accordingly, the vicinity of the predetermined public transportation building may be defined by a predetermined area or a combination of predetermined areas covering the entire predetermined public transportation building. Each of the plurality of position data items may be considered to be indicative of whether or not the mobile device was located in the vicinity of the predetermined public transportation building when the respective position parameter was captured, if the respective position parameter represented by the respective position data items indicates the predetermined area covering the (e.g. absolute) position of the mobile device. For example, the mobile device may be considered to be in the vicinity of the predetermined public transportation building, if the respective position parameter represented by the respective position data items indicates a predetermined area at least partially defining the vicinity of the predetermined public transportation building.

An example of a predetermined area is a coverage area of a radio device like a basis station of a cellular communication network or a wireless access point of a wireless communication network. Accordingly, a position parameter (e.g. each position parameter represented by the plurality of position data items) may be determined at least partially based on one or more radio signals captured by a radio sensor (e.g. a radio interface) of the mobile device, for example by extracting, from each of the captured one or more radio signals, a respective identifier like a name, an address (e.g. a MAC address or an IP address), an universally unique identifier (UUID), a service set identifier (SSID), a basic service set identifier (BSSID), cell identifier (Cell ID), or a combination thereof. The respective identifier(s) may be indicative of the coverage area covering the absolute position of the mobile device when the one or more radio signals were captured. Accordingly, the respective identifiers extracted from the captured one or more radio signals may serve as position parameters represented by the plurality of position data items. It is however to be understood that the invention is not limited thereto.

Each of the plurality of motion data items represents a respective motion parameter captured by the mobile device within the vicinity of the predetermined public transportation building. It is to be understood that the mobile device may repeatedly (e.g. periodically) capture a motion parameter such that the plurality of motion data items represents a sequence of motion parameters captured by the mobile device within the vicinity of the predetermined public transportation building.

If the mobile device continuously captures motion parameters, the plurality of motion data items representing a respective motion parameters captured by the mobile device within the vicinity of the predetermined public transportation building may be part of a greater plurality of motion data items representing motion parameters captured by the mobile device. Alternatively, the mobile device may only capture motion parameters or may only collect (e.g. store) captured motion parameters if it is within the vicinity of the predetermined public transportation building (e.g. if the position data item representing the last position parameter captured by the mobile device indicates that the mobile device was in the vicinity of the predetermined public transportation building when the position parameter was captured).

A motion parameter (e.g. each motion parameter represented by the plurality of motion data items) may be indicative of a motion of the mobile device or of a user of the mobile device when the motion parameter was captured. Examples of such a motion parameter are a speed parameter, an acceleration parameter, a motion direction parameter, an orientation parameter, an activity parameter, a step parameter, an atmospheric pressure parameter, etc. Accordingly, a motion parameter may be captured by a motion sensor of the mobile device, for example by a speed sensor, an acceleration sensor, a gyroscope, an activity sensor, a step sensor, a pressure sensor, etc.

Determining, at least partially based on at least one of (1) the plurality of positioning data items, (2) the plurality of motion data items and (3) public transportation data, whether or not the mobile device (1) has left the vicinity of the predetermined public transportation building on board of a public transportation vehicle and/or (2) has arrived at the vicinity of the predetermined public transportation building on board of a public transportation vehicle may be understood to mean that the determining depends on or is a function of at least one of (1) the plurality of position data items, (2) the plurality of motion data items and (3) the public transportation data. It is however to be understood that the disclosed determining may additionally depend on or may optionally be a function of further information (e.g. further data items).

It is to be understood that the disclosed determining step comprises (1) determining whether or not the mobile device has left the vicinity of the predetermined public transportation building on board of a public transportation vehicle (e.g. this relates to the case that the predetermined public transportation building is a departure location for the mobile device or the user of the mobile device); or (2) determining whether or not the mobile device has arrived at the vicinity of the predetermined public transportation building on board of a public transportation vehicle (e.g. this relates to the case that the predetermined public transportation building is an arrival location for the mobile device or the user of the mobile device); or (3) determining whether or not the mobile device has left the vicinity of the predetermined public transportation building on board of a public transportation vehicle and has arrived at the vicinity of the predetermined public transportation building on board of a public transportation vehicle (e.g. this relates to the case that the predetermined public transportation building is a transit location for the mobile device or the user of the mobile device).

The disclosed determining step may be performed according to predetermined rules (e.g. one or more predetermined algorithms). For example, the predetermined rules may define one or more data items or one or more patterns of data items for which, if they occur, it is to be determined that the mobile device (1) has left the vicinity of the predetermined public transportation building on board of a public transportation vehicle and/or (2) has arrived at the vicinity of the predetermined public transportation building on board of a public transportation vehicle.

Associating one or more of the plurality of motion data items with a boarding or waiting or arrival area for passengers of the public transportation vehicle within the predetermined public transportation building if it is determined that the mobile device has left the vicinity of the predetermined public transportation building on board of a public transportation vehicle and/or has arrived at the vicinity of the predetermined public transportation building on board of a public transportation vehicle may be understood to mean that the associating is only performed if it is determined that the mobile device has left the vicinity of the predetermined public transportation building on board of a public transportation vehicle and/or has arrived at the vicinity of the predetermined public transportation building on board of a public transportation vehicle.

For example, it may be assumed that, if the mobile device is on board of a public transportation vehicle which has left the vicinity of the predetermined public transportation building, a user of the mobile device and, thus, the mobile device were within a boarding or waiting or arrival area for passengers of the public transportation vehicle before leaving the vicinity of the predetermined public transportation building. Similarly, it may be assumed that, if the mobile device is on board of a public transportation vehicle which has arrived at the vicinity of the predetermined public transportation building, a user of the mobile device and, thus, the mobile device was within a boarding or waiting or arrival area for passengers of the public transportation vehicle after arriving at the vicinity of the predetermined public transportation building.

The boarding or waiting or arrival area may be a predetermined area of the predetermined public transportation building. For example, the predetermined public transportation building may comprise a plurality of boarding or waiting or arrival areas. Such a boarding or waiting or arrival area may for example comprise an exit for boarding a public transportation vehicle and/or an entrance for entering the predetermined public transportation building.

The one or more of the plurality of motion data items may for example be one or more motion data items of the plurality of motion data items representing the last one or more motion parameter captured by the mobile device before leaving the vicinity of the predetermined public transportation building or after arriving at the vicinity of the predetermined public transportation building. For example, it may be predetermined that at least one or a certain number of motion data items representing the last motion parameter(s) captured by the mobile device before leaving the vicinity of the predetermined public transportation building is to be associated with the boarding or waiting or arrival area for passengers of the public transportation vehicle if it is determined that that the mobile device has left the vicinity of the predetermined public transportation building on board of a public transportation vehicle. Similarly, it may be predetermined that at least one or a certain number of motion data items representing the first motion parameter(s) captured by the mobile device after arriving at the vicinity of the predetermined public transportation building is to be associated with the boarding or waiting or arrival area for passengers of the public transportation vehicle if it is determined that that the mobile device has arrived at the vicinity of the predetermined public transportation building on board of a public transportation vehicle. Alternatively, it may for example be predetermined that all motion data items representing motion parameter(s) captured by the mobile device in a certain period of time before arriving at and/or leaving the vicinity of the predetermined public transportation building are to be associated with the boarding or waiting or arrival area for passengers of the public transportation vehicle.

The one or more of the plurality of motion data items may for example be associated with the boarding or waiting or arrival area by adding corresponding association data (like an index of the boarding or waiting or arrival area, a pointer to the boarding or waiting or arrival area, a representation of the boarding or waiting or arrival area, etc.) to the one or more of the plurality of motion data items.

The disclosed method thus allows determining at least a coarse position of the mobile device within the predetermined public transportation building even if it is not possible to determine a GNSS-based position of the mobile device. The coarse position of the mobile device represented by the boarding or waiting or arrival area may then be considered to be the position of the mobile device when the last parameter(s) (e.g. radio signal parameters, motion parameters, etc.) was/were captured by the mobile device before leaving the vicinity of the predetermined public transportation building and/or when the first parameter(s) (e.g. radio signal parameters, motion parameters, etc.) was/were captured by the mobile device after arriving at the vicinity of the predetermined public transportation building.

By associating one or more of the plurality of motion data items with the boarding or waiting or arrival area, it may for example be indicated or assumed for further processing of the plurality of motion data items that the one or more of the plurality of motion data items were at least partially captured within the boarding or waiting or arrival area for passengers of the public transportation vehicle.

According to a further exemplary aspect of the invention, an apparatus is disclosed, wherein the apparatus comprises means for performing the steps of any one embodiment of the disclosed method or a part thereof (e.g. at least some steps of any one embodiment of the disclosed method).

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code, the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example the disclosed apparatus(es) may be (a) module(s) or component(s) for (a) mobile device(s) or (a) server(s), for example (a) chip(s) or chipset(s). Alternatively, the disclosed apparatus(es) may be (a) mobile device(s) or (a) server(s). The mobile device may be configured for determining its position based on a non-GNSS based radio positioning system as disclosed above, for example a BLUETOOTH® WLAN or cellular based radio positioning system or a combination thereof. The server may be a positioning server of such a non-GNSS based radio positioning system.

It is to be understood that the disclosed apparatus(es) may comprise only the disclosed components (e.g. means) or may further comprise one or more additional components (e.g. means). Examples of such additional components are a radio interface (e.g. a receiver, a transmitter and/or a transceiver), a data interface, a user interface (e.g. a touch-sensitive display, a keyboard, a touchpad, a display, etc.), a sensor, etc.

According to a further exemplary aspect of the invention, a positioning system is disclosed which comprises at least one of the disclosed apparatus(es), for example a mobile device and a positioning server.

As disclosed above, the positioning server may be configured to receive a plurality of radio fingerprint observation reports during the training stage and to determine a radio map for a predetermined environment at least partially based on the plurality of radio fingerprint observation reports. The positioning server may be further configured to provide the radio map to the at least one apparatus (e.g. the mobile device) to enable the apparatus to estimate (e.g. determine) its position based on radio signals observed at a certain position of the apparatus if the apparatus is located within the predetermined environment.

The positioning server may be part of a plurality of servers (e.g. forming a positioning cloud) or may be represented by such a plurality of servers (e.g. forming a positioning cloud).

According to a further exemplary aspect of the invention, a non-transitory computer readable storage medium is disclosed, in which computer program code is stored. The computer program code causes an apparatus to perform any one embodiment of the disclosed method (e.g. the steps of any one embodiment of the disclosed method) when executed by a processor or by a plurality of processors. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor (or by a plurality of processors) causing an apparatus to perform any one embodiment of the disclosed method (e.g. the steps of any one embodiment of the disclosed method).

The disclosed method, apparatus(es), system, non-transitory computer readable storage medium and computer program code may be for determining a non-GNSS (e.g. indoor) position of a mobile device, for example for determining a non-GNSS based (e.g. indoor) position of a mobile device for determining or updating a radio map for an indoor radio positioning system.

In the following, further features and embodiments of these exemplary aspects of the invention will be described.

According to an exemplary embodiment of the invention, each of the plurality of position data items represents a respective capture time indicating when the respective position parameter was captured by the mobile device. Each position data item may contain a respective time stamp representing the capture time, for example in Unix-time or as combined date and time representation as specified in the ISO 8601 specification.

According to an exemplary embodiment of the invention, each of the plurality of motion data items represents a respective capture time indicating when the respective motion parameter was captured by the mobile device. Each motion data item may contain a respective time stamp representing the capture time, for example in Unix-time or as combined date and time representation as specified in the ISO 8601 specification.

According to an exemplary embodiment of the invention, the predetermined public transportation building is one of an airport or airport building, a train station or train station building, a bus terminal or bus terminal building, or a ferry terminal or ferry terminal building. For example, the at least one boarding or waiting or arrival area for passengers of the public transportation vehicle is one of a gate of the airport or airport building, a platform of the train station or train station building, a platform of the bus terminal or bus terminal building, or a gangway of the ferry terminal or ferry terminal building.

According to an exemplary embodiment of the invention, the public transportation data represents at least one of (1) a departure time schedule for public transportation vehicles, (2) an arrival time schedule for public transportation vehicles, (3) a route map for public transportation vehicles or (4) boarding or waiting or arrival areas for passengers of public transportation vehicle. The public transportation data may for example be part of a public transportation database, for example provided by one or more database servers of a public transportation service or a third party service.

According to an exemplary embodiment of the invention, the determining whether or not the mobile device (1) has left the vicinity of the predetermined public transportation building on board of a public transportation vehicle and/or (2) has arrived at the vicinity of the predetermined public transportation building on board of a public transportation vehicle comprises determining, at least partially based on at least one of (1) the plurality of position data items and (2) the plurality of motion data items, at least one of:

whether or not the mobile device was/is or was/is not located in a vicinity of a predetermined public transportation building;

whether or not the mobile device was/is on board of a vehicle;

a departure time of the mobile device from the predetermined public transportation building;

an arrival time of the mobile device at the predetermined public transportation building;

a travel time of the mobile device on board of the vehicle;

a travel route of the mobile device on board of the vehicle.

The determining whether or not the mobile device (1) has left the vicinity of the predetermined public transportation building on board of a public transportation vehicle and/or (2) has arrived at the vicinity of the predetermined public transportation building on board of a public transportation vehicle may for example comprise two or more (e.g. subsequent or parallel) determining steps.

Determining at least one of (1) whether or not the mobile device was/is not located in a vicinity of a predetermined public transportation building and (2) whether or not the mobile device was/is on board of a vehicle may be part of a first determining step. For example, it may be assumed that the mobile device has left the predetermined public transportation building or the vicinity of the predetermined public transportation building if it is determined that it is not located in the vicinity of the predetermined public transportation building or that it is on board of a vehicle. Similarly, it may be assumed that the mobile device has arrived at the predetermined public transportation building or the vicinity of the predetermined public transportation building if it is determined that it is located in the vicinity of the predetermined public transportation building.

In a second step, it may then be determined whether or not the mobile device (1) has left the predetermined public transportation building or the vicinity of the predetermined public transportation building on board of a public transportation vehicle and/or (2) has arrived at the vicinity of the predetermined public transportation building on board of a public transportation vehicle. To this end, at least one of (1) the departure time of the mobile device from the predetermined public transportation building, (2) the arrival time of the mobile device at the predetermined public transportation building, (3) the travel time and (4) the travel route of the mobile device on board of the public transportation vehicle may be determined and, subsequently, matched (e.g. compared) with public transportation data.

A position parameter represented by a position data item of the plurality of position data items may indicate a predetermined area covering the (e.g. absolute) position of the mobile device when the position parameter was captured (i.e. the capture time). As disclosed above, the vicinity of the predetermined public transportation building may be defined by such a predetermined area or a combination of such predetermined areas.

Accordingly, if a certain position parameter captured by the mobile device represented by a certain position data item of the plurality of position data items does not indicate a predetermined area at least partially defining the vicinity of the predetermined public transportation building, it may be determined that the mobile device was not located in the vicinity of the predetermined public transportation building at the capture time of the certain position parameter (e.g. represented by a time stamp contained in the position data item); and, if a certain position parameter captured by the mobile device represented by a certain position data item of the plurality of position data items indicates a predetermined area at least partially defining the vicinity of the predetermined public transportation building, it may be determined that the mobile device was located in the vicinity of the predetermined public transportation building at the capture time of the certain position parameter (e.g. represented by a time stamp contained in the position data item). In particular, it may be determined that the mobile device is currently not located in the vicinity of the predetermined public transportation building if the last position parameter captured by the mobile device represented by a position data item (e.g. the last position data item generated by or received from the mobile device) of the plurality of position data items does not indicate a predetermined area at least partially defining the vicinity of the predetermined public transportation building; and it may be determined that the mobile device is currently located in the vicinity of the predetermined public transportation building if the last position parameter captured by the mobile device represented by a position data item (e.g. the last position data item generated by or received from the mobile device) of the plurality of position data items indicates a predetermined area at least partially defining the vicinity of the predetermined public transportation building.

Moreover, a minimum speed of the mobile device may be determined based on a minimum distance between coarse positions of the mobile device represented by position parameters of two position data items of the plurality of position data items and a time difference between the capture times when the position parameters represented by these two position data items of the plurality of position data items were captured. If the determined minimum speed is greater than a predefined speed threshold value (e.g. 20 km/h for a bus or 200 km/h for an airplane), it may be determined that the mobile device is on board of a vehicle.

A motion parameter represented by a motion data item of the plurality of motion data items may be indicative of a motion of the mobile device when the motion parameter was captured. Examples of such a motion parameter disclosed above are a speed of the mobile device, an acceleration of the mobile device, a motion direction of the mobile device, an orientation of the mobile device, an activity of a user of the mobile device, a step count or length of a user of the mobile device, an atmospheric pressure experienced by the mobile device, etc. Accordingly, if one or more certain motion parameters captured by the mobile device represented by one or more certain motion data items of the plurality of motion data items indicate(s) a motion of the mobile device which is characteristic for a vehicle, it may be determined that the mobile device is on a vehicle. To name a few non-limiting examples, a speed value (e.g. represented by a motion data item) greater than a predefined speed threshold value (e.g. 20 km/h for a bus or 200 km/h for an airplane) or an acceleration value (e.g. represented by a motion data item) greater than a predefined acceleration threshold value (e.g. 1 $m/s^2$) or a an acceleration value (e.g. represented by more than one subsequent motion data items) greater than a predefined acceleration threshold value (e.g. 1 $m/s^2$) for a predefined threshold acceleration time period (e.g. 5 s) or atmospheric pressure a difference (e.g. represented by two subsequent motion data items) greater than a predefined atmospheric pressure difference threshold value may be defined to be characteristic for a motion of a vehicle.

A departure time of the mobile device from the predetermined public transportation building may for example be determined based on a time stamp contained in a data item based on which it is determined that the mobile device was/is not located in a vicinity of a predetermined public transportation building and/or the mobile device was/is on board of a vehicle. For example, it may be determined that the departure time of the mobile device from the predetermined public transportation building is the capture time represented by the time stamp of such a data item. If there are subsequent data items (e.g. data items representing subsequently captured parameters) indicating that that the mobile device was/is not located in a vicinity of a predetermined public transportation building and/or the mobile device was/is on board of a vehicle, it may be determined that the departure time of the mobile device from predetermined public transportation building is the capture time represented by the time stamp of the first data item of the subsequent data items (i.e. the earliest capture time represented by the time stamps of the subsequent data items).

Similarly, an arrival time of the mobile device at the predetermined public transportation building may for example be determined based on a time stamp contained in a data item based on which it is determined that the mobile device was/is located in a vicinity of a predetermined public transportation building. For example, it may be determined that the arrival time of the mobile device at the predetermined public transportation building is the capture time represented by the time stamp of such a data item. If there are subsequent data items (e.g. data items representing subsequently captured parameters) indicating that that the mobile device was/is located in a vicinity of a predetermined public transportation building, it may be determined that the arrival time of the mobile device at the predetermined public transportation building is the capture time represented by the time stamp of the first data item of the subsequent data items (i.e. the earliest capture time represented by the time stamps of the subsequent data items).

It is however to be understood that the departure time and/or arrival time may be determined based on other data items (e.g. data items representing an operating mode of the mobile device) as well. For example, if it is determined that the mobile device is not located in the vicinity of the predetermined public transportation building, it may be determined that the departure time from the predetermined public transportation building is a time when the mobile device was switched off or switched into the airplane mode and/or that the arrival time at the predetermined public transportation building is a time when the mobile device was switched on or switched into the normal mode. For example, if the public transportation vehicle is an airplane, the mobile device may be switched into the airplane mode before take-off and into the normal mode after landing. Accordingly, position parameters indicating that the mobile device is not located in the vicinity of the predetermined public transportation building (e.g. the departure airport) or is located in the vicinity of the predetermined public transportation building (e.g. the destination airport) may be captured for the first time after landing of the airplane. In this scenario, the time when the mobile device was switched into the airplane mode may be determined to be the departure time of the mobile device from the predetermined public transportation building (e.g. the departure airport) or the time when the mobile device was switched into the normal mode may be determined to be the arrival time of the mobile device at the predetermined public transportation building (e.g. the destination airport).

A travel time of the mobile device on board of the vehicle may be determined based on time stamps contained in subsequent data items (e.g. data items representing subsequently captured parameters) which indicate or based on which it is determined that the mobile device was/is not located in a vicinity of a predetermined public transportation building and/or the mobile device was/is on board of a vehicle. For example, it may be determined that the travel time of the mobile device on board of the vehicle is the time period between the capture time represented by the time stamp of the first data item of the subsequent data items (i.e. the earliest capture time represented by the time stamps of the subsequent data items) and the capture time represented by the time stamp of the last data item of the subsequent data items (i.e. the latest capture time represented by the time stamps of the subsequent data items).

It is however to be understood that the travel time may be determined based on other data items (e.g. data items representing an operating mode of the mobile device) as well. For example, if it is determined that the mobile device is not located in the vicinity of the predetermined public transportation building, it may be determined that the travel time from the predetermined public transportation building is the time period between switching the mobile device off or into an airplane mode (e.g. at a departure location) and switching the device on or into a normal model (e.g. at an arrival location). As disclosed above, if the public transportation vehicle is an airplane, the mobile device may for example be switched into the airplane mode before take-off and into the normal mode after landing. In this scenario, the time period between switching the mobile device into the airplane mode and switching the mobile device into the normal mode may be determined to be the travel time of the mobile device on board of the vehicle.

A travel route of the mobile device on board of the vehicle may be determined based on position data items subsequently captured by the mobile device during the travel time of the mobile device on board of the vehicle. For example, it may be determined that the travel route of the mobile device on board of the vehicle may be represented by position parameters subsequently captured by the mobile device during the travel time of the mobile device on board of the vehicle and represented by subsequent position data items of the plurality of position data items. Considering the above example that the mobile device is switched off or switched into an airplane mode, the travel route of the mobile device may be determined to be represented by the last position data item captured before switching the mobile device off or into the airplane mode (e.g. at the departure location) and the first position data item captured after switching the mobile device on or into normal mode (e.g. at the arrival location). Therein, it may be assumed that the last position data item represents an arrival location of the vehicle like an interim destination or a final destination.

According to an exemplary embodiment of the invention, the determining whether or not the mobile device (1) has left the vicinity of the predetermined public transportation building on board of a public transportation vehicle and/or (2) has arrived at the vicinity of the predetermined public transportation building on board of a public transportation comprises determining, at least partially based on the public transportation data, at least one of:

departure times of public transportation vehicles departing from the predetermined public transportation building;

arrival times of public transportation vehicles arriving at the predetermined public transportation building;

travel times of public transportation vehicles departing from or arriving at the predetermined public transportation building;

travel routes of public transportation vehicles departing from or arriving at the predetermined public transportation building.

The determining whether or not the mobile device has left the vicinity of the predetermined public transportation building on board of a public transportation vehicle may for example comprise two or more (e.g. subsequent or parallel) determining steps.

As disclosed above, the first step may comprise determining at least one of (1) whether or not the mobile device was/is not located in a vicinity of a predetermined public transportation building a and (2) whether or not the mobile device was/is on board of a vehicle may be part of a first determining step. In a second step, it may then be determined whether or not the mobile device has left and/or arrived at the predetermined public transportation building or the vicinity of the predetermined public transportation building on board of a public transportation vehicle. To this end, at least one of (1) the departure time of the mobile device from the predetermined public transportation building, (2) the arrival time of the mobile device at the predetermined public transportation building, (3) the travel time and (4) the travel route of the mobile device on board of the public transportation vehicle may be determined and, subsequently, matched (e.g. compared) with public transportation data. Moreover, determining at least one of the (1) departure times, (2) arrival times, (3) travel times and (4) travel routes of public transportation vehicles departing from and/or arriving at the predetermined public transportation building may be part of the second step.

As disclosed above, the public transportation data represent at least one of (1) a departure time schedule for public transportation vehicles, (2) an arrival time schedule for public transportation vehicles or (3) a route map for public transportation vehicles. Determining at least one of the (1) departure times, (2) arrival times, (3) travel times and (4) travel routes of public transportation vehicles departing from and/or arriving at the predetermined public transportation building may thus be understood to mean identifying (e.g. searching for) at least one of the (1) departure times, (2) arrival times, (3) travel times and (4) travel routes of public transportation vehicles departing from and/or arriving at the predetermined public transportation represented by the public transportation data. Therein, a travel time of a certain public transportation vehicle departing from the predetermined public transportation building may be understood to be the travel time from the predetermined public transportation building (e.g. a departure location) to a scheduled arrival location like the next stop or the final destination; and a travel time of a certain public transportation vehicle arriving at the predetermined public transportation building may be understood to be the travel time from a scheduled departure location like the previous stop and the predetermined public transportation building (e.g. an arrival location).

Subsequently, a match may be determined between the at least one of (1) the departure time of the mobile device from the predetermined public transportation building, (2) arrival time of the mobile device from the predetermined public transportation building, (3) the travel time and (4) the travel route of the mobile device on board of the public transportation vehicle and the at least one of the (1) departure times, (2) arrival times, (3) travel times and (4) travel routes of public transportation vehicles departing from and/or arriving at the predetermined public transportation in order to determine whether or not the mobile device has left and/or arrived at the vicinity of the predetermined public transportation building on board of a public transportation vehicle and in order to identify the public transportation vehicle. For example, the match may be determined based on this information by means of a matching algorithm identifying the most likely public transportation vehicle (e.g. represented by an identifier of the public transportation vehicle like a flight number, a train number, a bus number, etc.) on board of which the mobile device may have left and/or arrived at the vicinity of the predetermined public transportation building.

As disclosed above, the public transportation data may also represent boarding or waiting or arrival areas for passengers of public transportation vehicles. Accordingly, the at least one boarding or waiting or arrival area for passengers of the public transportation vehicle that is determined to be the public transportation on board of which the mobile device has left and/or has arrived at the vicinity of the predetermined public transportation building most likely may be subsequently determined based on the public transportation data and associated with the one or more of the plurality of motion data items.

For example, if the predetermined public transportation building is an airport and the public transportation vehicle is an airplane and it is determined that the mobile device is not located in the vicinity of the airport, the departure time of the mobile device from the airport (e.g. as represented by the time of switching the mobile device into the airplane mode), the travel time of the mobile device to the arrival airport (e.g. as represented by the time period between into the airplane mode and switching the mobile device into the normal mode) and the travel route of the mobile device (e.g. as represented by position data items captured before switching the mobile device into the airplane mode and after switching the mobile device into the normal mode) may be matched with departure times, travel times and travel routes of airplanes departing from the airport to determine the airplane on board of which the mobile device may have left the airport most likely. To this end, only airplanes may be considered having the same travel route, and, from these airplanes, the airplane having at least one of the best matching (e.g. the closest) (1) departure time or (2) travel time or (3) travel route (e.g. represented by the departure airport and the arrival airport) may be determined to be the airplane on board of which the mobile device may have left the airport. The gate of the airport for passengers boarding this airplane may then be associated with the one or more of the plurality of motion data items.

According to an exemplary embodiment of the invention, the method further comprises:

determining, at least partially based on the plurality of motion data items and the boarding or waiting or arrival area associated with one or more of the plurality of motion data items, a path of the mobile device within the predetermined public transportation building.

The path of the mobile device within the predetermined public transportation building may be understood to be a path of the user of the mobile device carrying the mobile device from an entrance of the predetermined public transportation building to the boarding or waiting or arrival area for passengers of the public transportation vehicle.

The determining may be performed by means of a path determining algorithm, for example by means of a particle filter or a map matching algorithm. Accordingly, the determining may be additionally based on map data representing a map of the predetermined public transportation building. For example, the map of the predetermined public transportation building may represent the location of the boarding or waiting or arrival area within the predetermined public transportation building. In particular, the map may represent one or more (e.g. all) entrances and/or one or more (e.g. all) boarding or waiting or arrival areas of the predetermined public transportation building.

According to an exemplary embodiment of the invention, the method further comprises:

collecting a plurality of radio fingerprint observation reports captured by the mobile device within the vicinity of the predetermined public transportation building.

Each of the plurality of radio fingerprint observation reports represents one or more respective radio signal parameters captured (e.g. measured and/or determined) by the mobile device (e.g. by a radio sensor like a radio interface of the mobile device) at a respective observation position within the vicinity of the predetermined public transportation building. It is to be understood that the mobile device may repeatedly (e.g. periodically) capture radio signal parameters such that the plurality of radio fingerprint observation reports represents a sequence of radio signal parameters captured by the mobile device within the vicinity of the predetermined public transportation building.

If the mobile device continuously captures radio signal parameters, the plurality of radio fingerprint observation reports representing one or more respective motion parameters captured by the mobile device within the vicinity of the predetermined public transportation building may be part of a greater plurality of motion data items representing radio signal parameters captured by the mobile device. Alternatively, the mobile device may only capture or collect (e.g. store) radio signal parameters if it is within the vicinity of the predetermined public transportation building (e.g. if the position data item representing the last position parameter captured by the mobile device indicates that the mobile device was in the vicinity of the predetermined public transportation building when the position parameter was captured).

A radio signal parameter (e.g. each radio signal parameter represented by the plurality of radio fingerprint observation reports) may be indicative or characteristic for one or more radio signals observable at the observation position where the radio signal parameter is/was captured by the mobile device. Therein, a radio signal may be understood to be observable at a certain observation position if the radio signal is receivable with a minimum quality (e.g. a minimum signal-to-noise ratio and/or a minimum signal power, e.g. at least −90 dbm or −95 dbm) at this observation position. For example, the mobile device may determine at least one respective radio signal parameter for each radio signal observed at a certain observation position. The determined radio signal parameters may then for example be represented by a radio finger print observation report generated by the mobile device for this observation position.

Examples of radio signal parameters represented by a radio fingerprint observation report are an identifier of a radio signal, a signal quality parameter, a received signal strength parameter or a signal-to-noise ratio parameter.

An identifier of a radio signal may be understood to mean information contained in an observable radio signal which is configured to enable identifying the radio signal and/or distinguishing the radio signal from other radio signals. An example for such an identifier of a radio signal is an identifier of a radio device transmitting the radio signal like a like a name, an address (e.g. a MAC address or an IP address), an universally unique identifier (UUID), a service set identifier (SSID), a basic service set identifier (BSSID), or a combination thereof. For example, the identifiers of the one or more radio signals may be obtained by extracting the identifiers from the one or more radio signals when scanning for observable radio signals at the first position and the second position.

A signal quality parameter may be understood to mean information indicating the reception quality of an observable radio signal. Examples of such signal quality parameters are a received signal strength parameter and a signal-to-noise ratio parameter.

A received signal strength parameter may represent the receiving power of an observed radio signal. In other words, the received signal strength parameter may represent the receiving power of a radio signal observed by the mobile device when scanning for observable radio signals. For example, the mobile device may measure the receiving power of a radio signal observed by the mobile device when scanning for observable radio signals. An example, of a received signal strength parameter is a received signal strength indicator (RSSI) or a physical receiving power level (e.g. a Rx power level) in dBm.

A signal-to-noise ratio parameter may represent a ratio of the receiving power of an observed radio signal and the receiving power of observed background noise. For example, when scanning for observable radio signals, the mobile device may measure the receiving power of a radio signal observed by the mobile device and the receiving power of the background noise observed by the mobile device. An example, of a signal-to-noise ratio parameter is a value representing the ratio of the receiving power of an observed radio signal and the receiving power of observed background noise in dB.

For example, each of the plurality of radio fingerprint observation reports may represent at least one of these exemplary parameters.

Alternatively or additionally, each of the plurality of radio fingerprint observation reports may represent a respective capture time indicating when the respective radio fingerprint observation report was captured by the mobile device. Each of radio fingerprint observation report may contain a respective time stamp representing the capture time, for example in Unix time or as combined date and time representation as specified in the ISO 8601 specification.

As disclosed above, the plurality of radio fingerprint observation reports may be provided to a positioning server for determining or updating a radio map for a predetermined environment like the predetermined public transportation building at least partially based on the plurality of radio fingerprint observation reports. The positioning server may be further configured to provide the radio map to the at least one apparatus (e.g. the mobile device) to enable the apparatus to estimate (e.g. determine) its position based on radio signals observed at a certain position of the apparatus if the apparatus is located within the predetermined environment.

At least some (e.g. each) of the plurality of radio fingerprint observation reports may not represent a respective observation position. For example, the mobile device may not be able to determine its respective observation position when capturing radio signal parameters of observable radio signals within the predetermined public transportation building, for example because it is not possible to determine a GNSS-based position of the mobile device within the predetermined public transportation building. However, without knowing the observation position of radio signal parameters represented by a certain radio fingerprint observation report, the positioning server cannot determine or update a radio map based on this radio fingerprint observation report.

The disclosed method may further comprise:

associating one or more of the plurality of radio fingerprint observation reports with the boarding or waiting or arrival area for passengers of the public transportation vehicle for determining or updating a radio map of the predetermined public transportation building.

The one or more of the plurality of radio fingerprint observation reports may for example be one or more radio fingerprint observation reports of the plurality of radio fingerprint observation reports representing the last one or more radio signal parameters captured by the mobile device before leaving the vicinity of the predetermined public transportation building. For example, it may be predetermined that at least one or a certain number of radio fingerprint observation reports representing the last radio signal parameter(s) captured by the mobile device before leaving the vicinity of the predetermined public transportation building is to be associated with the boarding or waiting or arrival area for passengers of the public transportation vehicle. Alternatively, it may for example be predetermined that all radio signal observation reports representing radio signal parameter(s) captured by the mobile device in a certain period of time before leaving and/or after arriving at the vicinity of the predetermined public transportation building are to be associated with the at least one boarding or waiting or arrival area for passengers of the public transportation vehicle.

The one or more of the plurality of radio fingerprint observation reports may for example be associated with the at least one boarding or waiting or arrival area for passengers of the public transportation vehicle within the predetermined public transportation building by adding corresponding association data (like an index of the boarding or waiting or arrival area, a pointer to the boarding or waiting or arrival area, a representation of the boarding or waiting or arrival area, etc.) to the one or more of the plurality of radio fingerprint observation reports.

As disclosed above, it may be assumed that, if the mobile device is on board of a public transportation vehicle, a user of the mobile device and, thus, the mobile device were within the boarding or waiting or arrival area for passengers of the public transportation vehicle before leaving the vicinity of the predetermined public transportation building. Based on this assumption, the disclosed method thus allows determining at least a coarse position of the mobile device within the predetermined public transportation building even if it is not possible to determine a (e.g GNSS-based) position of the mobile device before leaving the vicinity of the predetermined public transportation building. The coarse position of the mobile device represented by the boarding or waiting or arrival area may then be considered (e.g. for determining or updating a radio map of the predetermined public transportation building) to be the observation position of the mobile device when the last radio signal parameter(s) was/were captured by the mobile device before leaving the vicinity of the predetermined public transportation building.

By associating one or more of the plurality of radio signal parameters with the boarding or waiting or arrival area for passengers of the public transportation vehicle within the predetermined public transportation building, it is thus possible to determine for each radio signal parameter represented by the one or more of the plurality of motion data items a respective observation position even if it is/was not possible to determine a (e.g. GNSS based) observation position of the mobile device when the one or more of the plurality of motion data items are/were captured.

Alternatively or additionally, the disclosed method may further comprise:

associating one or more of the plurality of radio fingerprint observation reports with the path of the mobile device within the predetermined public transportation building for determining or updating a radio map of the predetermined public transportation building.

The one or more of the plurality of radio fingerprint observation reports may for example be one or more radio fingerprint observation reports of the plurality of radio fingerprint observation reports representing one or more radio signal parameters captured by the mobile device within the predetermined public transportation building.

Associating one or more of the plurality of radio fingerprint observation reports with the path of the mobile device within the predetermined public transportation building for determining or updating a radio map of the predetermined public transportation building may be understood to mean that each of the one or more of the plurality of radio fingerprint observation reports is associated with a respective position on the path of the mobile device within the predetermined public transportation building. Therein, the respective position on the path of the mobile device within the predetermined public transportation building may then be considered (e.g. for determining or updating a radio map of the predetermined public transportation building) to be the respective observation position of the mobile device when the respective radio signal parameter(s) represented by the respective radio fingerprint observation report associated with the respective position on the path was/were captured by the mobile device.

As disclosed above, the path of the mobile device within the predetermined public transportation building may be determined at least partially based on the plurality of motion data items. If each of the plurality of motion data items represents a respective capture time, subsequent sections or subsequent points of the path of the mobile device within the predetermined public transportation building may be mapped to these capture times allowing to determine a time profile of the path of the mobile device within the predetermined public transportation building. Moreover, if each of the plurality of radio fingerprint observation reports represents a respective capture time as well, such a time profile of the path of the mobile device within the predetermined public transportation building may be used to map each of the one or more of the plurality of radio fingerprint observation report to a respective position on the path of the mobile device within the predetermined public transportation building and to associate the one or more of the plurality of radio fingerprint observation report with these positions on the path of the mobile device within the predetermined public transportation building.

The one or more of the plurality of radio fingerprint observation reports may for example be associated with the path of the mobile device within the predetermined public transportation building by adding corresponding association data (like a representation of the path, a respective position on the path, etc.) to the one or more of the plurality of radio fingerprint observation reports.

By associating one or more of the plurality of motion data items with the plurality of radio fingerprint observation reports with the path of the mobile device within the predetermined public transportation building for determining or updating a radio map of the predetermined public transportation building, it is thus possible to determine for each radio signal parameter represented by the one or more of the plurality of motion data items a respective observation position even if it is not possible to determine a (e.g. GNSS based) observation position of the mobile device when the one or more of the plurality of motion data items are captured.

According to an exemplary embodiment of the invention, each of the plurality of position data items represents a respective one of the following position parameters:

global navigation satellite system, GNSS, coordinates representing a GNSS position;

a cell identifier of a cellular communication;

an identifier of a wireless communication device.

GNSS coordinates may for example be position coordinates of a position of the mobile device captured (e.g. determined) by a GNSS sensor of the mobile device. Examples such a GNSS are GPS or Galileo.

A cell identifier may be understood to be a Cell ID (CID) or UTRAN Cell ID (LCD) in a cellular communication network like a 2G/3G/4G/5G cellular communication network. The 2G/3G/4G/5G cellular radio communication standards are developed by the 3GPP and presently available under http://www.3gpp.org/. Such a cell identifier may be captured by extracting the cell identifier from a radio signal received by a radio interface like a cellular communication interface of the mobile device.

A wireless communication device may be understood to be a radio device like an access point of a wireless local area network (WLAN) or a BLUETOOTH® beacon. WLAN is for example specified by the standards of the IEEE 802.11 family (http://www.ieee.org/) The BLUETOOTH® standards are specified by the BLUETOOTH® Special Interest Group and are presently available under https://www.bluetooth.com/. An example for identifier of a wireless communication device is a name like a name, an address (e.g. a MAC address or an IP address), an universally unique identifier (UUID), a service set identifier (SSID), a basic service set identifier (BSSID), or a combination thereof. Such an identifier of a wireless communication device may be captured by extracting the identifier from a radio signal transmitted by the wireless communication device, for example received by a radio interface like a wireless communication interface of the mobile device.

According to an exemplary embodiment of the invention, each of the plurality of motion data items represents a respective one of the following motion parameters:

a speed parameter;

an acceleration parameter;

an activity parameter;

a step parameter;

an atmospheric pressure parameter;

motion direction parameter;

an orientation parameter.

The speed parameter may be representative of a speed value of the mobile device or of a user of the mobile device, for example captured by a speed sensor.

The acceleration parameter may be representative of an acceleration value of the mobile device or of a user of the mobile device, for example captured by an acceleration sensor.

The activity parameter may be representative of an activity of the mobile device or of a user of the mobile device, for example captured by an activity sensor. Examples of such activities of the user of the mobile device are walking, running, cycling, swimming, etc.

The step parameter may be representative of a step length or step count of a user of a mobile device, for example captured by a step sensor.

The atmospheric pressure parameter may be representative of an atmospheric pressure experienced by the mobile device or by a user of the mobile device, for example captured by a pressure sensor (e.g. a barometer).

The motion direction parameter may be representative of a direction of a motion of the mobile device or of a user of the mobile device, for example captured by motion direction sensor (e.g. a compass or gyroscope).

The orientation parameter may be representative of an orientation of the mobile device or of a user of the mobile device, for example captured by an orientation sensor (e.g. a compass or gyroscope).

It is to be understood that the above disclosed motion parameters may be captured by a motion sensor of the mobile device. However, these motion parameters may be captured as well by an motion sensor of an external device (e.g. a smart watch, a fitness tracker, etc.) and received by the mobile device from the external device.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
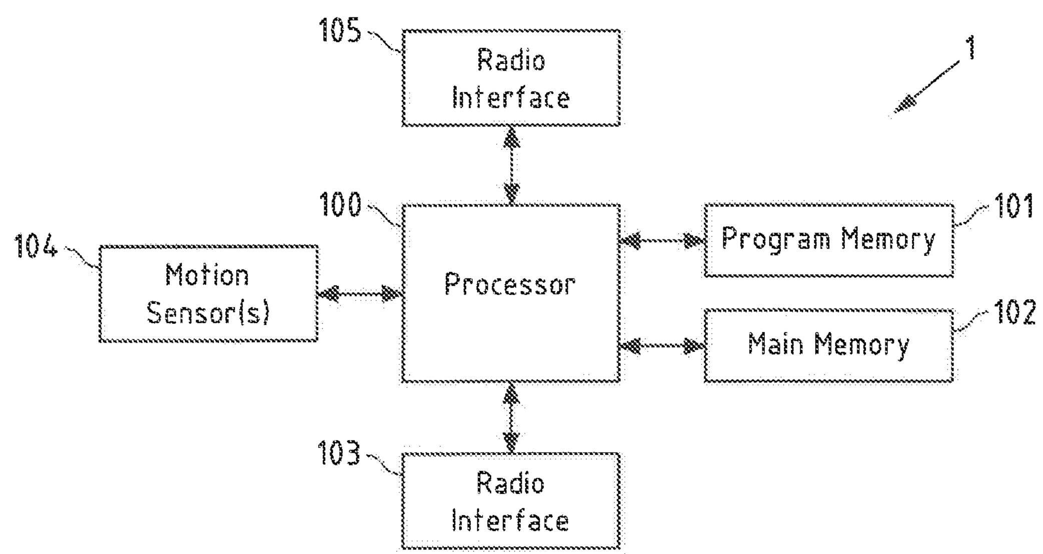
FIG. 1 is a block diagram of an exemplary embodiment of a mobile device according to the invention.

FIG. 1 is a block diagram of an exemplary embodiment of mobile device 1 according to the invention.

Mobile device 1 comprises a processor 100. Processor 100 may represent a single processor or two or more processors, which are for instance at least partially coupled, for instance via a bus. Processor 100 executes a computer program code stored in program memory 101 (e.g. computer program code causing mobile device 1 to perform any one embodiment of the disclosed method (e.g. the steps of any one embodiment of the disclosed method) or a part thereof (e.g. at least some steps of any one embodiment of the disclosed method) (as for instance further described below with reference to FIG. 2), when executed on processor 100), and interfaces with a main memory 102. Program memory 101 may also contain an operating system for processor 100 and serves for storing a plurality of motion data items, a plurality of position data items and a plurality of radio fingerprint observation reports. Some or all of memories 101 and 102 may also be included into processor 100. One of or both of memories 101 and 102 may be fixedly connected to processor 100 or at least partially removable from processor 200, for example in the form of a memory card or stick.

A program memory (e.g. program memory 101) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 102) may for example be a volatile memory. It may for example be a DRAM memory, to give non-limiting example. It may for instance be used as a working memory for a processor (e.g. processor 100) when executing an operating system and/or programs.

Processor 100 further controls a radio interface 103 configured for receiving and, optionally, transmitting radio signals. A radio interface may be or may comprise a radio receiver circuit and/or a radio transmitter circuit and/or a radio transceiver circuit. Such circuits may comprise modulators, filters, mixers, switches and/or one or more antennas to allow transmission and/or reception of radio signals.

In the following, it is assumed for exemplary purposes that radio interface 103 is a BLE transceiver configured to transmit and receive BLE radio signals in line with any current or future version of the BLUETOOTH® standard supporting a low energy mode. Radio interface 103 enables mobile device 2 to repeatedly scan for observable BLE radio signals transmitted (e.g. broadcasted) by BLE beacons. Therein, a BLE radio signal may be understood to be observable if the BLE radio signal is receivable with a minimum quality (e.g. a minimum signal-to-noise ratio and/or a minimum signal power, e.g. at least −90 dBm or −95 dBm). Moreover, the BLE transceiver is configured, alone or together with processor 200, to capture one or more radio signal parameters of BLE radio signals observed (e.g. received) when scanning for observable radio signals. To this end, the BLE transceiver may for example extract, from each observed BLE radio signal, the respective UUID contained therein and measure the respective received signal strength of each observed BLE radio signal. The extracted UUIDs and the received signal strength values may then for example be provided to processor 100 as radio signal parameters. Processor 100 may then generate a radio fingerprint observation report representing the captured radio signal parameters and a capture time (e.g. as time stamp) indicating when these radio signal parameters were captured. It is to be understood that any computer program code required for receiving and processing received BLE radio signals may be stored in an own memory of the radio interface 103 and executed by an own processor of the radio interface 103 or it may be stored for example in memory 102 and executed for example by processor 100.

Moreover, processor 100 controls one or more motion sensors 104 configured for repeatedly capturing one or more motion parameters indicative of a motion of the mobile device or of a user of the mobile device when the motion parameter is captured. Examples of such a motion parameter are a speed parameter representative of a speed value of the mobile device or of a user of the mobile device, an acceleration parameter representative of an acceleration value of the mobile device or of a user of the mobile device, an activity parameter representative of an activity (e.g. walking, running, cycling, swimming, etc.) of the mobile device or of a user of the mobile device, a step parameter representative of a step length or step count of a user of a mobile device, an atmospheric pressure parameter representative of an atmospheric pressure experienced by the mobile device or by a user of the mobile device, a motion direction parameter representative of a direction of a motion of the mobile device or of a user of the mobile device or an orientation parameter representative of an orientation of the mobile device or of a user of the mobile device. Accordingly the motion sensors 204 may be at least one of a speed sensor, an acceleration sensor, an activity sensor, a step sensor, a pressure sensor or a motion direction or orientation sensor (e.g. a compass or gyroscope). The captured motion parameter may then for example be provided to processor 100; and Processor 100 may then generate a motion data item representing the captured motion parameter and a capture time (e.g. as time stamp) indicating when this motion parameter was captured. It is to be understood that any computer program code required for capturing motion parameters may be stored in an own memory of the sensors 104 and executed by an own processor of the sensors 104 or it may be stored for example in memory 102 and executed for example by processor 100.

Processor 100 further controls radio interface 105 configured to communicate via a cellular communication network (e.g. to transmit and receive cellular radio signals). For example, radio interface 105 may be or may comprise a 2G/3G/4G/5G radio transceiver. Mobile device 1 may use radio interface 105 to repeatedly extract a cell identifier from received cellular radio signals.

As disclosed above, a cell identifier may be understood to be a Cell ID (CID) or UTRAN Cell ID (LCD) in a cellular communication network like a 2G/3G/4G/5G cellular communication network. Such a Cell ID may be considered to be indicative of the coarse position of the mobile device when the cellular radio signal representing the respective Cell ID is/was received, because it indicates that the (e.g. absolute) position of the mobile device is/was in the coverage area of the network node of the cellular communication network transmitting the cellular radio signal containing the respective Cell ID. Therein, the coverage areas of the network nodes of the cellular communication network may be known and, thus, considered to be predetermined areas. Accordingly, the extracted cell identifier may be provided to processor 100 as position parameter. Processor 100 may then generate a position data item representing the captured position parameter and a capture time (e.g. as time stamp) indicating when this position parameter was captured. It is to be understood that any computer program code required for capturing position parameters may be stored in an own memory of the radio interface 105 and executed by an own processor of the radio interface 105 or it may be stored for example in memory 102 and executed for example by processor 100.

The components 101 to 105 of mobile device 1 may for instance be connected with processor 100 by means of one or more serial and/or parallel busses.

It is to be understood that mobile device 1 may comprise various other components like a user interface for receiving user input or a GNSS sensor.

Figure 2:
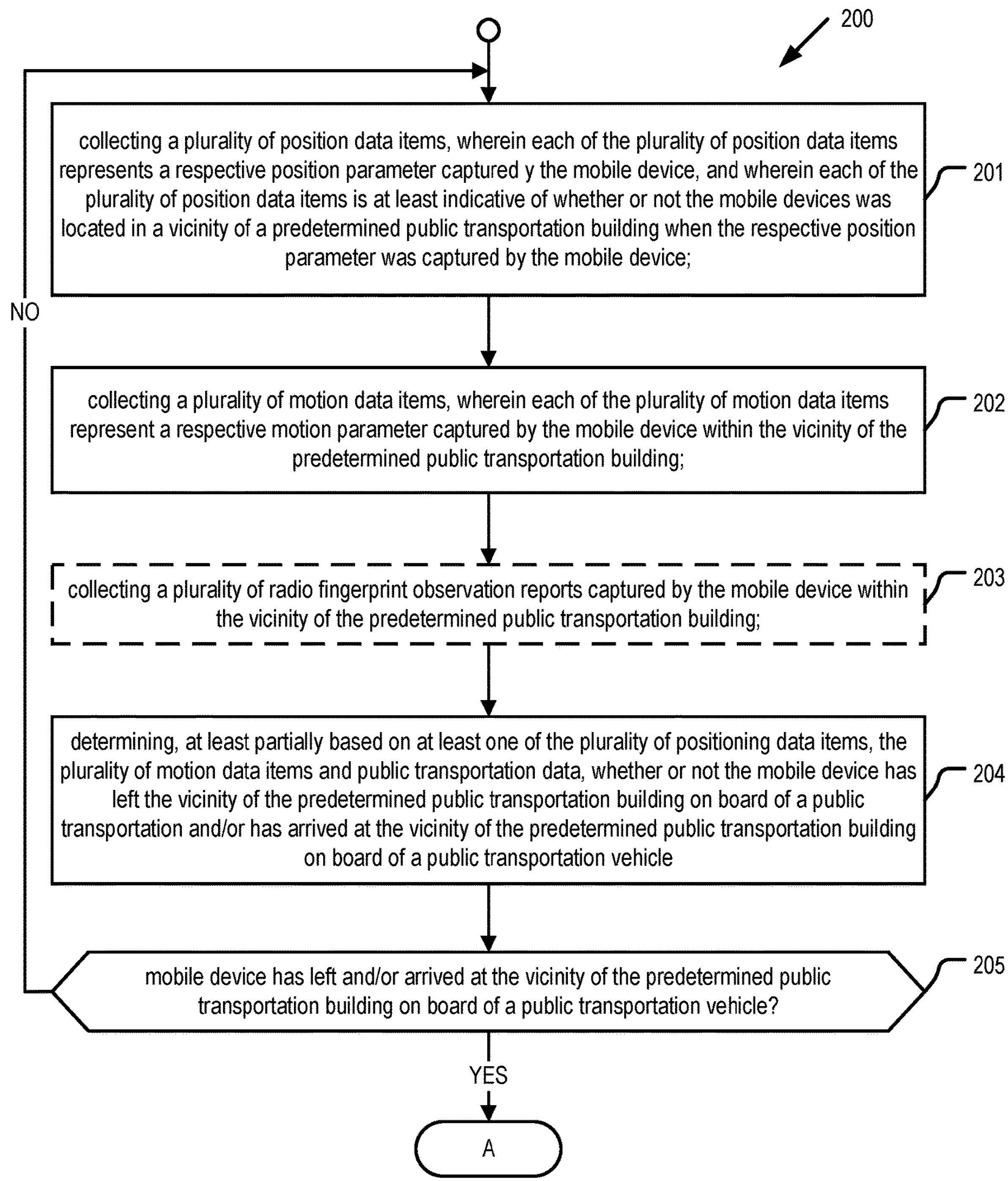
FIG. 2 is a flow chart illustrating an exemplary embodiment of a method according to the invention.
Figure 2:
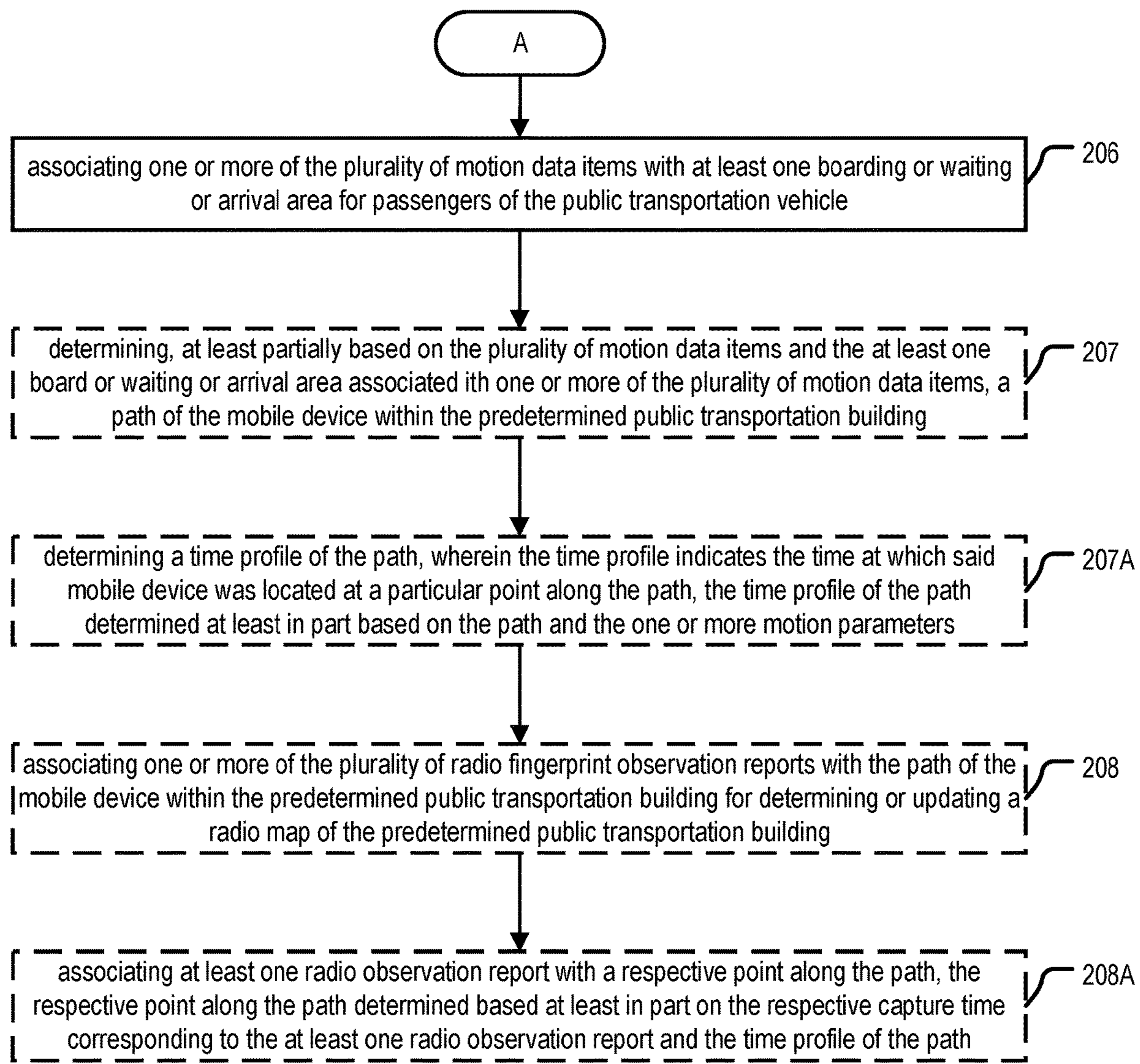

FIG. 2 is a flow chart 200 illustrating an exemplary embodiment of a method according to the invention. It is assumed in the following that the predetermined public transportation building is a predetermined airport and that the public transportation vehicle is an airplane. It is however to be understood that the invention is not limited to such predetermined public transportation buildings and public transportation vehicles, but may for example be applied as well in the context of train station and train, a bus terminal and a bus or a ferry terminal and a ferry as predetermined public transportation building and public transportation vehicle.

For example, the predetermined airport may be understood to be an airport for which a non-GNSS based indoor positioning system as disclosed above is provided which is in the training stage. It is to be understood that the predetermined airport may be part of a plurality of predetermined public transportation buildings for which it is predetermined that the method according to flow chart 200 should be applied with respect to them.

Without limiting the scope of the invention, it is moreover assumed in the following that mobile device 1 as described above with respect to FIG. 1 performs the steps of flow chart 200. However, it is to be understood that a server like a positioning server of the non-GNSS based indoor positioning system provided for the predetermined airport may perform the steps of flow chart 200 equally well.

In a step 201 a plurality of position data items are collected by mobile device 1, wherein each of the plurality of position data items represents a respective position parameter captured by the mobile device, and wherein each of the plurality of position data items is at least indicative of whether or not the mobile device was located in a vicinity of the predetermined airport when the respective position parameter was captured by the mobile device.

Collecting a plurality of position data items may be understood to mean that position data items subsequently generated by (e.g. processor 100 of) mobile device 1 are stored in program memory 101 of mobile device 1. As disclosed above, each of the plurality of position data items represents a respective Cell ID as position parameter which is indicative of the respective coverage area of the network node of the cellular communication system which covers the (e.g. absolute) position of the mobile device when the respective Cell ID was captured by the mobile device. Since the coverage areas of the network nodes of the cellular communication network may be known and, thus, considered to be predetermined areas, the vicinity of the predetermined airport may be defined by one or more coverage areas of one or more network nodes of the cellular communication network covering the predetermined airport entirely. Moreover, each of the plurality of position data items represents a respective capture time (e.g. as a time stamp).

In a step 202, a plurality of motion data items are collected by mobile device 1, wherein each of the plurality of motion data items represent a respective motion parameter captured by the mobile device within the vicinity of the predetermined airport. Collecting a plurality of motion data items may be understood to mean that motion data items subsequently generated by (e.g. processor 100 of) mobile device 1 are stored in program memory 101 of mobile device 1.

To only collect a plurality of motion data items representing a respective motion parameter captured by the mobile device within the vicinity of the predetermined airport, the mobile device may in step 202 only store a motion data item representing a motion parameter captured by the mobile device if the last Cell ID captured by mobile device as position parameter (e.g. the position parameter represented by the last position data item stored in step 201) indicates that the mobile device was in the vicinity of the predetermined airport when the position parameter was captured.

As disclosed above, each of the plurality of motion data items may represent at least one of a speed parameter, an acceleration parameter, an activity parameter, a step parameter, an atmospheric pressure parameter, a motion direction parameter or an orientation parameter. Moreover, each of the plurality of motion data items represents a respective capture time (e.g. as a time stamp).

In an optional step 203, a plurality of radio fingerprint observation reports captured by the mobile device within the vicinity of the predetermined airport are collected. Collecting a plurality of radio fingerprint observation reports may be understood to mean that radio fingerprint observation reports subsequently generated by (e.g. processor 100 of) mobile device 1 are stored in program memory 101 of mobile device 1.

As disclosed above, each of the radio fingerprint observation reports may represent one or more respective UUIDs and received signal strengths as respective radio signal parameters and a capture time (e.g. as time stamp).

In a step 204, it is determined, at least partially based on at least one of (1) the plurality of positioning data items, (2) the plurality of motion data items and (3) public transportation data, whether or not the mobile device has left the vicinity of the predetermined airport on board of an airplane and/or arrived at the vicinity of the predetermined airport on board of an airplane.

As disclosed above, the public transportation data may represent at least one of (1) a departure time schedule for public transportation vehicles, (2) an arrival time schedule for public transportation vehicles, (3) a route map for public transportation vehicles or (4) boarding or waiting or arrival areas for passengers of public transportation vehicle. The public transportation data may for example be part of a public transportation database, for example provided by one or more database servers of a public transportation service or a third party service. An example of such a public transportation database for global flight information is presently accessibly via http://flightradar24.com.

The determining in step 204 may comprise two or more (e.g. subsequent or parallel) determining steps.

For example, it may be assumed that mobile device 1 has left the predetermined airport or the vicinity of the predetermined airport if it is determined that it is not located in the vicinity of the predetermined airport or that it is on board of a vehicle; and it may be assumed that mobile device 1 has arrived at the predetermined airport or the vicinity of the predetermined airport if it is determined that it is located in the vicinity of the predetermined airport. Accordingly, the first step may for example comprise determining at least one of (1) whether or not the mobile device was/is or was/is not located in a vicinity of a predetermined airport and (2) whether or not the mobile device was/is on board of a vehicle. In a second step, it may then be determined whether or not the mobile device has left and/or arrived at the predetermined airport or the vicinity of the predetermined airport on board of an airplane.

Determining at least one of (1) whether or not the mobile device was/is or was/is not located in the vicinity of the predetermined airport and (2) whether or not the mobile device was/is on board of a vehicle may be based on the plurality of position data items. For example, it may be determined based on a certain Cell ID represented by a certain position data item of the plurality of position data items that the mobile device was/is not located in the vicinity of the predetermined airport when the Cell ID was/is captured, if the Cell ID is not indicative of a coverage area of a network node of the cellular communication system at least partially defining the vicinity of the predetermined airport; and it may be determined based on a certain Cell ID represented by a certain position data item of the plurality of position data items that the mobile device was/is located in the vicinity of the predetermined airport when the Cell ID was/is captured, if the Cell ID is indicative of a coverage area of a network node of the cellular communication system at least partially defining the vicinity of the predetermined airport. Alternatively or additionally, a minimum speed of the mobile device may be determined based on the minimum distance(s) between two non-overlapping coverage areas indicated by Cell IDs of two position data items of the plurality of position data items and the time difference(s) between the captures time represented by these two position data items of the plurality of position data items. If the minimum speed is greater than a predefined speed threshold value (e.g. 200 km/h), it may be determined that the mobile device was/is on board of an airplane when the Cell IDs were/are captured.

Alternatively or additionally, it may be determined based on the plurality of motion data items whether or not the mobile device was/is on board of an airplane. For example, if a speed parameter represented by a motion data item of the plurality of motion data items represents a speed greater than the predefined speed threshold value (e.g. 200 km/h), it may be determined that the mobile device was/is on board of an airplane when the speed parameter was/is captured.

If it is determined that the mobile device was/is not located in the vicinity of the predetermined airport and/or was/is on board of an airplane, it may be assumed that mobile device 1 has left the vicinity of the predetermined airport and, thus, it may be determined in the second step whether or not the mobile device has left the predetermined airport or the vicinity of the predetermined airport on board of public transportation vehicle, like an airplane of an airline (e.g. an airliner). To this end, at least one of (1) a departure time of the mobile device from the predetermined airport, (2) a travel time or (3) a travel route of the mobile device on board of the airplane may be determined and matched to (e.g. compared with) at least one of (1) departure times, (2) travel times or (3) travel routes of airplanes departing from the predetermined airport as represented by the public transportation data.

If it is determined that the mobile device was/is located in the vicinity of the predetermined airport, it may be may be assumed that mobile device 1 has arrived at the vicinity of the predetermined airport and, thus, it may be determined in the second step whether or not the mobile device has arrived at the predetermined airport or the vicinity of the predetermined airport on board of public transportation vehicle, like an airplane of an airline (e.g. an airliner). To this end, at least one of (1) an arrival time of the mobile device from the predetermined airport, (2) a travel time or (3) a travel route of the mobile device on board of the airplane may be determined and matched to (e.g. compared with) at least one of (1) arrival times, (2) travel times or (3) travel routes of airplanes arriving at the predetermined airport as represented by the public transportation data.

As disclosed above in more detail, the departure time of the mobile device from the predetermined airport or the arrival time of the mobile device at the predetermined airport as well as the travel time and the travel route of the mobile device on board of the airplane may be determined based on the plurality of position data items.

It is however to be understood that they may be determined based on other data items like data items representing an operating mode of the mobile device as well. For example, a mobile device is typically switched off or into the airplane mode on board of an airplane. Accordingly, the departure time may be determined to correspond to the time of switching the mobile device off or into the airplane mode and the arrival time may be determined to correspond to the time of switching the mobile device on or into the normal mode. Moreover, the travel time may be determined to correspond to the time period between switching the mobile device off or into the airplane mode and switching the mobile device on or into the normal mode.

Alternatively or additionally, the departure time, arrival time or travel time (i.e. the difference between departure time and arrival time) may be determined based on the plurality of motion data items. For example, if a certain motion parameter of the plurality of motion data items indicates a motion of the mobile device that is characteristic for a take-off or landing, the capture time represented by the certain motion parameter may be determined to correspond to the departure time or arrival time. To name a few non-limiting examples, a tangential acceleration parameter greater than a predefined tangential acceleration threshold value or a difference between two subsequent atmospheric pressure parameters greater than a predefined atmospheric pressure difference threshold value may be defined to be characteristic for a take-off or landing.

If it is assumed that the mobile device has left the predetermined airport (e.g. if it is determined that the mobile device was/is not located in the vicinity of the predetermined airport and/or was/is on board of an airplane), the at least one of (1) a departure time of the mobile device from the predetermined airport, (2) a travel time or (3) a travel route of the mobile device on board of the airplane may then be compared with at least one of (1) departure times, (2) travel times or (3) travel routes of airplanes (e.g. airliners) departing from the predetermined airport as represented by the public transportation data to determine the airplane (e.g. airliner) on board of which the mobile device may have left the airport. To this end, only airplanes (e.g. airliners) may be considered having the same travel route, and, from these airplanes, the airplane having at least one of the best matching (e.g. the closest) (1) departure time or (2) travel time may be determined to be the airplane (e.g. airliner) on board of which the mobile device may have left the airport. For example, an airplane on board of which the mobile device may have left the predetermined airport or the vicinity of the predetermined airport may be determined by means of a matching algorithm.

If it is assumed that the mobile device has arrived at the predetermined airport (e.g. if it is determined that the mobile device was/is located in the vicinity of the predetermined airport), the at least one of (1) an arrival time of the mobile device at the predetermined airport, (2) a travel time or (3) a travel route of the mobile device on board of the airplane may then be compared with at least one of (1) arrival times, (2) travel times or (3) travel routes of airplanes (e.g. airliners) arriving at the predetermined airport as represented by the public transportation data to determine the airplane (e.g. airliner) on board of which the mobile device may have arrived at the airport. To this end, only airplanes (e.g. airliners) may be considered having the same travel route, and, from these airplanes, the airplane having at least one of the best matching (e.g. the closest) (1) arrival time or (2) travel time may be determined to be the airplane (e.g. airliner) on board of which the mobile device may have arrived at the airport. For example, an airplane on board of which the mobile device may have arrived at the predetermined airport or the vicinity of the predetermined airport may be determined by means of a matching algorithm.

If an airplane on board of which the mobile device may have left and/or arrived at the airport is not determined or not determinable (e.g. by means of the matching algorithm), it may be determined in step 204 that the mobile device has not left and/or arrived at the vicinity of the predetermined airport on board of a public transportation vehicle (e.g. an airplane of an airline like an airliner). In a step 205, the flow chart 200 may then be restarted or, alternatively, terminated.

Otherwise, if an airplane (e.g. an airliner represented by a flight number) on board of which the mobile device may have left and/or arrived at the airport is determined (e.g. by means of the matching algorithm), it may be determined in step 204 that the mobile device has left and/or arrived at the vicinity of the predetermined airport on board of a public transportation vehicle. As disclosed above, the public transportation data may also represent boarding or waiting or arrival areas for passengers of public transportation vehicles. Accordingly, the at least one boarding or waiting or arrival area for passengers of the airplane that is determined to be the airplane on board of which the mobile device may have left and/or arrived at the predetermined airport or the vicinity of the predetermined airport may be subsequently determined based on the public transportation data in step 204 as well.

In a step 206, one or more of the plurality of motion data items are associated with the boarding or waiting or arrival area for passengers of the airplane within the predetermined airport. Therein, the airplane may be the airplane determined in step 204 to be the airplane on board of which the mobile device may have left and/or arrived at the airport; and the boarding or waiting or arrival area for passengers determined in step 204 to be the boarding or waiting or arrival area for passengers of this airplane. It is to be understood that, if it is determined in step 204, that the mobile device has arrived at the predetermined airport on board of an airplane and has left the predetermined airport on board of another airplane, that one or more of the plurality of motion data items are associated with the boarding or waiting or arrival area for passengers of the arriving airplane and one or more of the plurality of motion data items are associated with the boarding or waiting or arrival area for passengers of the departing airplane.

For example, it may be assumed that, if mobile device 1 was/is on board of the airplane departing from the predetermined airport determined in step 204, a user of the mobile device and, thus, the mobile device were within a boarding or waiting or arrival area for passengers of this airplane before leaving the predetermined airport or the vicinity of the predetermined airport; and it may be assumed that, if mobile device 1 was/is on board of the airplane arriving at the predetermined airport determined in step 204, a user of the mobile device and, thus, the mobile device were/are within a boarding or waiting or arrival area for passengers of this airplane after arriving at the predetermined airport or the vicinity of the predetermined airport. Moreover, it may be assumed, that the last one or more motion parameter captured by the mobile device before the departure time of the airplane from the predetermined airport and/or after the arrival time of the airplane at the predetermined airport (e.g. as determined in step 204) were/are captured within the at least one boarding or waiting or arrival area.

In case that it is determined in step 204 that mobile device 1 has left the predetermined airport on board of an airplane, the one or more of the plurality of motion data items may for example be one or more motion data items of the plurality of motion data items representing the last one or more motion parameters captured by the mobile device before the departure time of the airplane from the predetermined airport (e.g. as determined in step 204). For example, it may be predetermined that at least one or a certain number of motion data items representing the last motion parameter(s) captured by the mobile device before the departure time of the airplane from the predetermined airport is to be associated with the boarding or waiting or arrival area for passengers of the airplane. Alternatively, it may for example be predetermined that all motion data items representing motion parameter(s) captured by the mobile device in a certain period of time before the departure time of the airplane from the predetermined airport are to be associated with the at least one boarding or waiting or arrival area for passengers of the airplane.

In case that it is determined in step 204 that mobile device has arrived at the predetermined airport on board of an airplane, the one or more of the plurality of motion data items may for example be one or more motion data items of the plurality of motion data items representing the first one or more motion parameters captured by the mobile device after the arrival time of the airplane at the predetermined airport (e.g. as determined in step 204). For example, it may be predetermined that at least one or a certain number of motion data items representing the first motion parameter(s) captured by the mobile device after the arrival time of the airplane at the predetermined airport is to be associated with the boarding or waiting or arrival area for passengers of the airplane. Alternatively, it may for example be predetermined that all motion data items representing motion parameter(s) captured by the mobile device in a certain period of time after the arrival time of the airplane at the predetermined airport are to be associated with the at least one boarding or waiting or arrival area for passengers of the airplane.

By associating one or more of the plurality of motion data items with a boarding or waiting or arrival area for passengers of the airplane within the predetermined airport, it may for example be indicated or assumed for further processing of the plurality of motion data items (e.g. as disclosed with respect to steps 207 and 208 below) that the one or more of the plurality of motion data items were at least partially captured within the boarding or waiting or arrival area for passengers of the airplane. For example, the one or more of the plurality of motion data items may for example be associated with the boarding or waiting or arrival area by adding corresponding association data (like an index of the boarding or waiting or arrival area, a pointer to the boarding or waiting or arrival area, a representation of the boarding or waiting or arrival area, etc.) to the one or more of the plurality of motion data items.

In an optional step 207, a path of the mobile device within the predetermined airport is determined at least partially based on the plurality of motion data items and the boarding or waiting or arrival area associated with one or more of the plurality of motion data items.

The path of the mobile device within the predetermined airport may be understood to be a path of the user of the mobile device carrying the mobile device from an entrance of the predetermined airport to the at least one boarding or waiting or arrival area of the airplane or from the at least one boarding or waiting or arrival area of the airplane to an exit of the predetermined airport or from the at least one boarding or waiting or arrival area of the airplane to another boarding or waiting or arrival area.

The determining in step 207 may be performed by means of a path determining algorithm, for example by means of a particle filter or a map matching algorithm. Accordingly, the determining may be additionally based on map data (e.g. stored in program memory 101 of mobile device 1) representing a map of the predetermined airport. For example, the map may represent all entrances, all exits and all boarding or waiting or arrival areas within the predetermined airport.

Since each of the plurality of motion data items represents a respective capture time, subsequent sections or subsequent points of the path of the mobile device within the predetermined airport may be mapped to these capture times. Accordingly, a time profile of the path of the mobile device within the predetermined airport may be determined in step 207 as well.

As a result of the determining in step 207, path data representing the determined path and, optionally, the time profile of the path may be obtained, for example in the form of waypoints and, optionally, arrival times at the waypoints. For example, at optional step 207A, a time profile of the path is determined. The time profile indicates the time at which the mobile device was located at a particular point along the path. The time profile of the path is determined at least in part based on the path and the one or more motion parameters.

In an optional step 208, one or more of the plurality of radio fingerprint observation reports are associated with the path of the mobile device within the predetermined airport for determining or updating a radio map of the predetermined airport. For example, at optional step 208A, at least one radio observation report is associated with a respective point along the path. The respective point along the path is determined based at least in part on the respective capture time corresponding to the at least one radio observation report and the time profile of the path.

Associating one or more of the plurality of radio fingerprint observation reports with the path of the mobile device within the predetermined airport for determining or updating a radio map of the predetermined airport may be understood to mean that each of the one or more of the plurality of radio fingerprint observation report is associated with a respective position on the path of the mobile device within the predetermined airport. Therein, the respective position on the path of the mobile device within the predetermined airport may then be considered (e.g. for determining or updating a radio map of the predetermined airport) to be the respective observation position of the mobile device when the respective radio signal parameter(s) represented by the respective radio fingerprint observation report associated with the respective position on the path was/were captured by the mobile device.

Since each of the plurality of radio fingerprint observation reports represents a respective capture time, the time profile of the path of mobile device 1 within the predetermined airport determined in step 207 may be used to map each of the one or more of the plurality of radio fingerprint observation reports to a respective position on this path and to associate it with the respective position on this path.

By associating one or more of the plurality of motion data items with the plurality of radio fingerprint observation reports with the path determined in step 207, it is thus possible to determine for each radio signal parameter represented by the one or more of the plurality of motion data items a respective observation position even if it is not possible to determine a (e.g. GNSS based) observation position of mobile device 1 when the one or more of the plurality of motion data items are captured. The one or more of the plurality of radio fingerprint observation reports may for example be associated with the path determined in step 207 by adding corresponding association data (like a representation of the path, a respective position on the path, etc.) to the one or more of the plurality of radio fingerprint observation reports.

Figure 3:
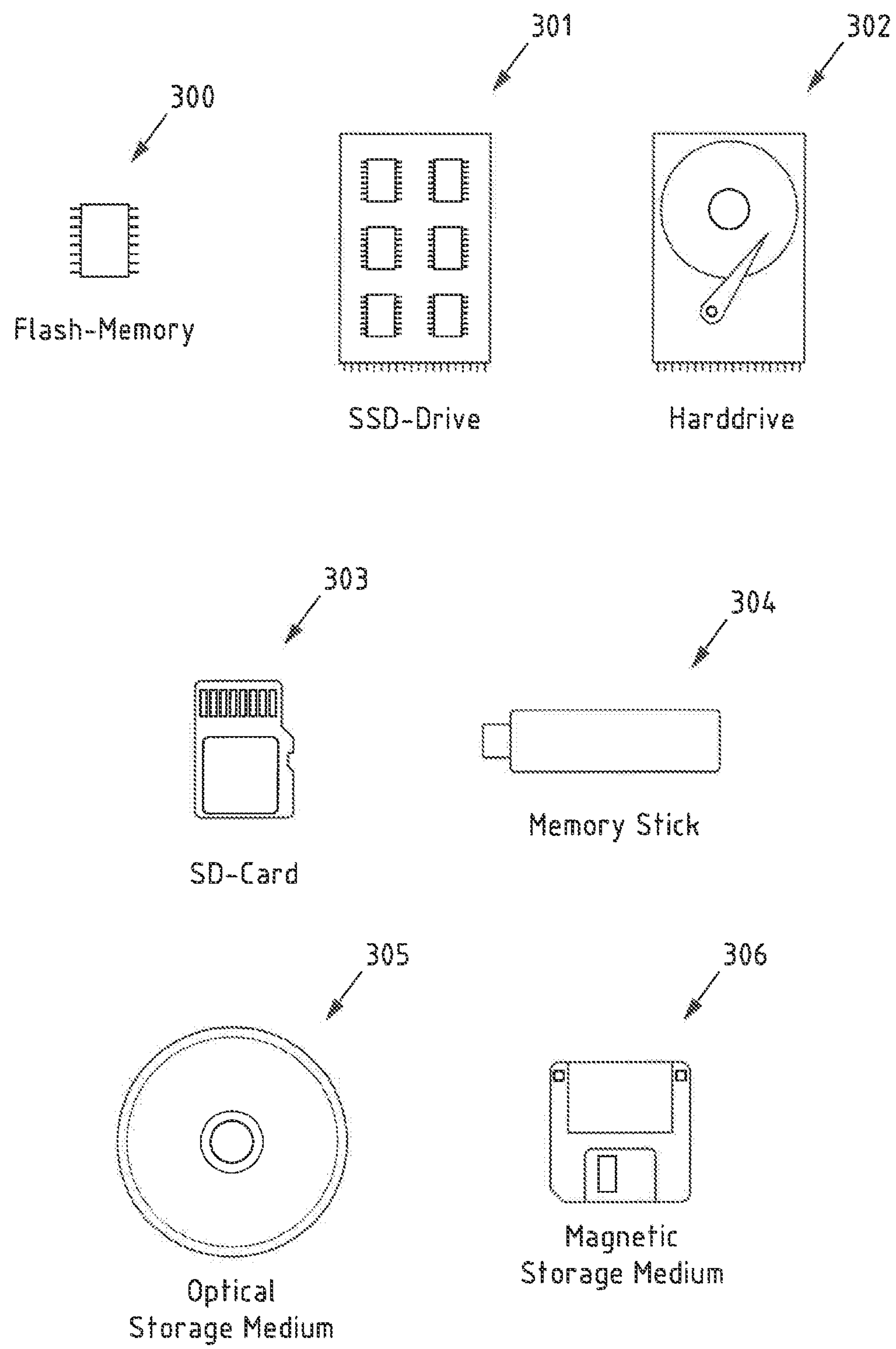
FIG. 3 is a schematic illustration of examples of tangible and non-transitory storage media according to the invention.

FIG. 3 is a schematic illustration of examples of tangible and non-transitory computer-readable storage media according to the present invention that may for instance be used to implement memory 101 of FIG. 1. To this end, FIG. 3 displays a flash memory 300, which may for instance be soldered or bonded to a printed circuit board, a solid-state drive 301 comprising a plurality of memory chips (e.g. Flash memory chips), a magnetic hard drive 302, a Secure Digital (SD) card 303, a Universal Serial Bus (USB) memory stick 304, an optical storage medium 305 (such as for instance a CD-ROM or DVD) and a magnetic storage medium 306.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 100 of FIG. 1 could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method comprising:

collecting a plurality of position data items, wherein each of said plurality of position data items represents a respective position parameter captured by a mobile device, and wherein each of said plurality of position data items at least indicates that said mobile device was located in a predetermined area associated with a predetermined public transportation building when said respective position parameter was captured by said mobile device;

collecting a plurality of motion data items, wherein each of said plurality of motion data items represents a respective motion parameter captured by said mobile device within said predetermined area associated with said predetermined public transportation building, the respective motion parameter being a measurement of a motion of said mobile device;

collecting a plurality of radio observation reports captured by said mobile device within said predetermined area associated with said predetermined public transportation building, each radio observation report of the plurality of radio observation reports indicating information regarding one or more radio signals observed at a respective capture time;

determining, at least partially based on at least one of said plurality of positioning data items, said plurality of motion data items, and public transportation data, that said mobile device has left said predetermined area on board of a public transportation vehicle via a boarding or waiting area, and/or has arrived at said predetermined area on board of a public transportation vehicle via an arrival area;

determining a path that said mobile device traversed through at least a portion of said predetermined public transportation building, wherein the path is determined based on one or more motion parameters of said plurality of motion data items and said boarding or waiting area and/or said arrival area;

determining a time profile of the path, wherein the time profile indicates the time at which said mobile device was located at a particular point along the path, the time profile of the path determined at least in part based on the path and the one or more motion parameters; and associating at least one radio observation report with a respective point along the path, the respective point along the path determined based at least in part on the respective capture time corresponding to the at least one radio observation report and the time profile of the path.

2. Method according to claim 1, wherein each of said plurality of position data items represents the respective capture time indicating when said respective position parameter was captured by said mobile device, and wherein each of said plurality of motion data items represents a respective capture time indicating when said respective motion parameter was captured by said mobile device.

3. Method according claim 1, wherein determining that said mobile device has left or arrived at said predetermined area via said boarding or waiting or arrival area comprises determining that said mobile device left or arrived at said predetermined area via one of a gate of an airport, a platform of a train station, a platform of a bus terminal or a gangway of a ferry terminal.

4. Method according to claim 1, wherein said public transportation data represents at least one of a departure time schedule for public transportation vehicles, an arrival time schedule for public transportation vehicles, a route map for public transportation vehicles or boarding or waiting or arrival areas for passengers of public transportation vehicles.

5. Method according to claim 1, wherein determining that said mobile device has left said predetermined area on board of a public transportation vehicle via said boarding or waiting area, and/or has arrived at said predetermined area on board of a public transportation vehicle via said arrival area comprises determining based on at least one of said plurality of position data items and said plurality of motion data items, at least one of:

that said mobile device is located in the predetermined area associated with the predetermined public transportation building;

that said mobile device is on board of a vehicle;

a departure time of said mobile device from said predetermined public transportation building;

an arrival time of said mobile device at said predetermined public transportation building;

a travel time of said mobile device on board of said vehicle; or a travel route of said mobile device on board of said vehicle.

6. Method according to claim 1, wherein determining that said mobile device has left said predetermined area on board of a public transportation vehicle via said boarding or waiting area, and/or has arrived at said predetermined area on board of a public transportation vehicle via said arrival area comprises determining, at least partially based on said public transportation data, at least one of:

departure times of public transportation vehicles departing from said predetermined public transportation building;

arrival times of public transportation vehicles arriving at said predetermined public transportation building;

travel times of public transportation vehicles departing from or arriving at said predetermined public transportation building; or travel routes of public transportation vehicles departing from or arriving at said predetermined public transportation building.

7. Method according to claim 1, wherein each of said plurality of position data items represents a respective one of the following position parameters:

global navigation satellite system, GNSS, coordinates representing a GNSS position;

a cell identifier of a cellular communication network; or an identifier of a wireless communication device.

8. Method according to claim 1, wherein each of said plurality of motion data items represents a respective one of the following motion parameters:

a speed parameter;

an acceleration parameter;

an activity parameter;

a step parameter;

an atmospheric pressure parameter;

a motion direction parameter; or an orientation parameter.

9. An apparatus comprising at least one processor and at least one memory containing computer program code, the at least one memory and the computer program code with the at least one processor configured to cause the apparatus at least to:

collect a plurality of position data items, wherein each of said plurality of position data items represents a respective position parameter captured by a mobile device, and wherein each of said plurality of position data items at least indicates that said mobile device was located in a predetermined area associated with a predetermined public transportation building when said respective position parameter was captured by said mobile device;

collect a plurality of motion data items, wherein each of said plurality of motion data items represents a respective motion parameter captured by said mobile device within said predetermined area associated with said predetermined public transportation building, the respective motion parameter being a measurement of a motion of said mobile device;

collect a plurality of radio observation reports captured by said mobile device within said predetermined area associated with said predetermined public transportation building, each radio observation report of the plurality of radio observation reports indicating information regarding one or more radio signals observed at a respective capture time;

determine, at least partially based on at least one of said plurality of positioning data items, said plurality of motion data items and public transportation data, that said mobile device has left said predetermined area on board of a public transportation vehicle via a boarding or waiting area and/or has arrived at said predetermined area on board of a public transportation vehicle via an arrival area;

determine a path that said mobile device traversed through at least a portion of said predetermined public transportation building, wherein the path is determined based on one or more motion parameters of said plurality of motion data items and said boarding or waiting area and/or said arrival area;

determine a time profile of the path, wherein the time profile indicates the time at which said mobile device was located at a particular point along the path, the time profile of the path determined at least in part based on the path and the one or more motion parameters; and associate at least one radio observation report with a respective point along the path, the respective point along the path determined based at least in part on the respective capture time corresponding to the at least one radio observation report and the time profile of the path.

10. Apparatus according to claim 9, wherein each of said plurality of position data items represents the respective capture time indicating when said respective position parameter was captured by said mobile device, and wherein each of said plurality of motion data items represents a respective capture time indicating when said respective motion parameter was captured by said mobile device.

11. Apparatus according to claim 9, wherein said public transportation data represents at least one of a departure time schedule for public transportation vehicles, an arrival time schedule for public transportation vehicles, a route map for public transportation vehicles or boarding or waiting or arrival areas for passengers of public transportation vehicles.

12. A non-transitory computer readable storage medium storing computer program code, wherein the computer program code, upon execution, causes an apparatus to:

collect a plurality of position data items, wherein each of said plurality of position data items represents a respective position parameter captured by a mobile device, and wherein each of said plurality of position data items at least indicates that said mobile device was located in a predetermined area associated with a predetermined public transportation building when said respective position parameter was captured by said mobile device;

collect a plurality of motion data items, wherein each of said plurality of motion data items represents a respective motion parameter captured by said mobile device within said predetermined area associated with said predetermined public transportation building, the respective motion parameter being a measurement of a motion of said mobile device;

collect a plurality of radio observation reports captured by said mobile device within said predetermined area associated with said predetermined public transportation building, each radio observation report of the plurality of radio observation reports indicating information regarding one or more radio signals observed at a respective capture time;

determine, at least partially based on at least one of said plurality of positioning data items, said plurality of motion data items and public transportation data, that said mobile device has left said predetermined area on board of a public transportation vehicle via a boarding or waiting area and/or has arrived at said predetermined area on board of a public transportation vehicle via an arrival area;

determine a path that said mobile device traversed through at least a portion of said predetermined public transportation building, wherein the path is determined based on one or more motion parameters of said plurality of motion data items and said boarding or waiting area and/or said arrival area;

determine a time profile of the path, wherein the time profile indicates the time at which said mobile device was located at a particular point along the path, the time profile of the path determined at least in part based on the path and the one or more motion parameters; and associate at least one radio observation report with a respective point along the path, the respective point along the path determined based at least in part on the respective capture time corresponding to the at least one radio observation report and the time profile of the path.

13. Method according to claim 1, further comprising:

in response to determining that said mobile device has left said predetermined area on board of a public transportation vehicle via said boarding or waiting area and/or has arrived at said predetermined area on board of a public transportation vehicle-via said arrival area, associating one or more of said plurality of motion data items with said at least one of boarding or waiting or arrival area of said public transportation vehicle.

14. Method according to claim 1, wherein the path said mobile device traversed through at least a portion of said predetermined public transportation building is determined using a particle filter or map matching algorithm.

15. Method according to claim 2, wherein the time profile of the path is determined at least in part based on respective capture times of one or more motion data items of the plurality of motion data items.

16. Method according to claim 1, wherein the path and the time profile of the path are determined after said mobile device has left said predetermined area.

17. Method according to claim 1, wherein the information regarding the one or more radio signals observed at the respective capture time of a radio observation report comprises at least one of an identifier of an observed radio signal, a signal quality parameter of the observed radio signal, a received signal strength of the observed radio signal, or a signal-to-noise ratio parameter of the observed radio signal.

18. Apparatus according to claim 9, wherein determining that said mobile device has left said predetermined area on board of a public transportation vehicle via said boarding or waiting area, and/or has arrived at said predetermined area on board of a public transportation vehicle via said arrival area comprises determining based on at least one of said plurality of position data items and said plurality of motion data items, at least one of:

that said mobile device is located in the predetermined area associated with the predetermined public transportation building;

that said mobile device is on board of a vehicle;

a departure time of said mobile device from said predetermined public transportation building;

an arrival time of said mobile device at said predetermined public transportation building;

a travel time of said mobile device on board of said vehicle; or a travel route of said mobile device on board of said vehicle.

19. Apparatus according to claim 9, wherein determining that said mobile device has left said predetermined area on board of a public transportation vehicle via said boarding or waiting area, and/or has arrived at said predetermined area on board of a public transportation vehicle via said arrival area comprises determining, at least partially based on said public transportation data, at least one of:

departure times of public transportation vehicles departing from said predetermined public transportation building;

arrival times of public transportation vehicles arriving at said predetermined public transportation building;

travel times of public transportation vehicles departing from or arriving at said predetermined public transportation building; or travel routes of public transportation vehicles departing from or arriving at said predetermined public transportation building.

* * * * *